United States Patent
Dunn et al.

(10) Patent No.: US 12,509,252 B2
(45) Date of Patent: Dec. 30, 2025

(54) SPACE VEHICLES WITH PARAGLIDER RE-ENTRY, AND ASSOCIATED SYSTEMS AND METHODS

(71) Applicant: Outpost Technologies Corporation, Topanga, CA (US)

(72) Inventors: Jason Dunn, Topanga, CA (US); Michael Vergalla, Mountain View, CA (US)

(73) Assignee: OUTPOST TECHNOLOGIES CORPORATION, Santa Monica, CA (US)

( * ) Notice: Subject to any disclaimer, the term of this patent is extended or adjusted under 35 U.S.C. 154(b) by 191 days.

(21) Appl. No.: 17/988,730

(22) Filed: Nov. 16, 2022

(65) Prior Publication Data

US 2023/0150700 A1    May 18, 2023

Related U.S. Application Data

(60) Provisional application No. 63/280,567, filed on Nov. 17, 2021.

(51) Int. Cl.
*B64G 1/58* (2006.01)
*B64G 1/22* (2006.01)
(Continued)

(52) U.S. Cl.
CPC .............. *B64G 1/58* (2013.01); *B64G 1/222* (2013.01); *B64G 1/2227* (2023.08); *B64G 1/401* (2013.01);
(Continued)

(58) Field of Classification Search
None
See application file for complete search history.

(56) References Cited

U.S. PATENT DOCUMENTS

| 4,865,272 A | 9/1989 | Schwarz |
| 5,056,740 A * | 10/1991 | Roth ................. H04B 7/18502 244/3.13 |

(Continued)

FOREIGN PATENT DOCUMENTS

| CN | 109455318 | 3/2019 |
| CN | 113184225 | 7/2021 |

(Continued)

OTHER PUBLICATIONS

Jacques Valverde—Thierry Pichon, "From IXV To Space Rider: CMC Thermal Protection System Evolutions," Ariane Group, HT-CMC/10th, Bordeaux, Sep. 22-26, 2019, 14 pages.

(Continued)

*Primary Examiner* — James J Lee
*Assistant Examiner* — Melanie G Huber
(74) *Attorney, Agent, or Firm* — Womble Bond Dickinson (US) LLP

(57) ABSTRACT

Space vehicles with paraglider re-entry, and associated systems and methods are disclosed. A representative system includes a re-useable space vehicle, a collapsible, deployable and re-stowable re-entry heat shield carried by the space vehicle, and a collapsible, deployable and re-stowable flexible paraglider wing also carried by the space vehicle. The space vehicle can accordingly carry out repeated space-based missions, and can be refurbished and replenished on Earth and/or at an orbiting dock between missions.

37 Claims, 16 Drawing Sheets

(51) Int. Cl.
  *B64G 1/40* (2006.01)
  *B64G 1/44* (2006.01)
  *B64G 1/62* (2006.01)

(52) U.S. Cl.
  CPC .............. *B64G 1/402* (2013.01); *B64G 1/44* (2013.01); *B64G 1/623* (2023.08)

(56) References Cited

U.S. PATENT DOCUMENTS

| | | | |
|---|---|---|---|
| 5,474,257 A * | 12/1995 | Fisher | B64C 31/028 244/49 |
| 5,927,653 A | 7/1999 | Mueller | |
| 6,830,222 B1 | 12/2004 | Nock et al. | |
| 7,487,939 B1 * | 2/2009 | Christof | B64D 17/80 244/902 |
| 8,366,052 B1 * | 2/2013 | Lutke | B64G 1/002 244/158.3 |
| 8,733,706 B1 | 5/2014 | Fernandez et al. | |
| 2003/0015625 A1 * | 1/2003 | McGee | B64G 1/443 244/172.6 |
| 2009/0108135 A1 * | 4/2009 | Shaw | B64D 27/24 244/30 |
| 2010/0314497 A1 | 12/2010 | Boelitz | |
| 2014/0151509 A1 * | 6/2014 | Zelon | B64G 1/646 244/158.9 |
| 2016/0264266 A1 * | 9/2016 | Stone | B64G 1/2227 |
| 2017/0233110 A1 | 8/2017 | Cook et al. | |
| 2018/0009539 A1 * | 1/2018 | Robertson | B64D 17/80 |
| 2019/0023419 A1 * | 1/2019 | Helvajian | B64G 1/10 |
| 2019/0023423 A1 * | 1/2019 | Grübler et al. | B64G 1/10 |
| 2020/0039667 A1 * | 2/2020 | Albright | B64G 1/625 |
| 2020/0198791 A1 * | 6/2020 | Nakamura | B64U 10/50 |
| 2023/0145106 A1 * | 5/2023 | Jasjukevics | B64G 1/14 244/158.9 |

FOREIGN PATENT DOCUMENTS

| | | |
|---|---|---|
| EP | 3822177 | 5/2021 |
| RU | 2 026 245 C1 | 1/1995 |

OTHER PUBLICATIONS

NASA, "Transformable Hypersonic Aerodynamic Decelerator," Technology Solution, www.nasa.gov, 2015, 2 pages.

Williams, Matt, "The Future Could Bring Pinpoint Deliveries from Orbit," Universe Today, https://www.universetoday.com/152643/the-future-could-bring-pinpoint-deliveries-from-orbit/, Sep. 24, 2021, 5 pages.

International Search Report (ISR) and Written Opinion for International Patent Application No. PCT/US22/50294, Applicant: Outpost Technologies Corporation, mailed Aug. 23, 2023, 15 pages.

Teitel, Amy Shira, "The Paraglider: How NASA Tried and Failed to Land Without Parachutes", Popular Science, Mar. 1, 2016, https://www.popsci.com/paraglider-how-nasa-tried-and-failed-to-land-without-parachutes/, (retrieved Mar. 11, 2025), 10 pages.

* cited by examiner

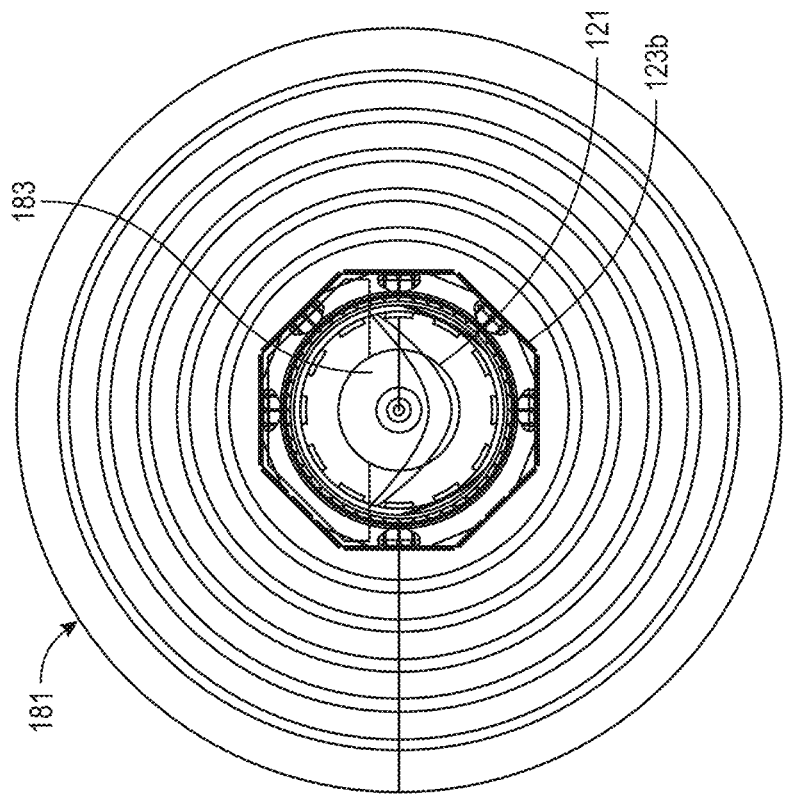
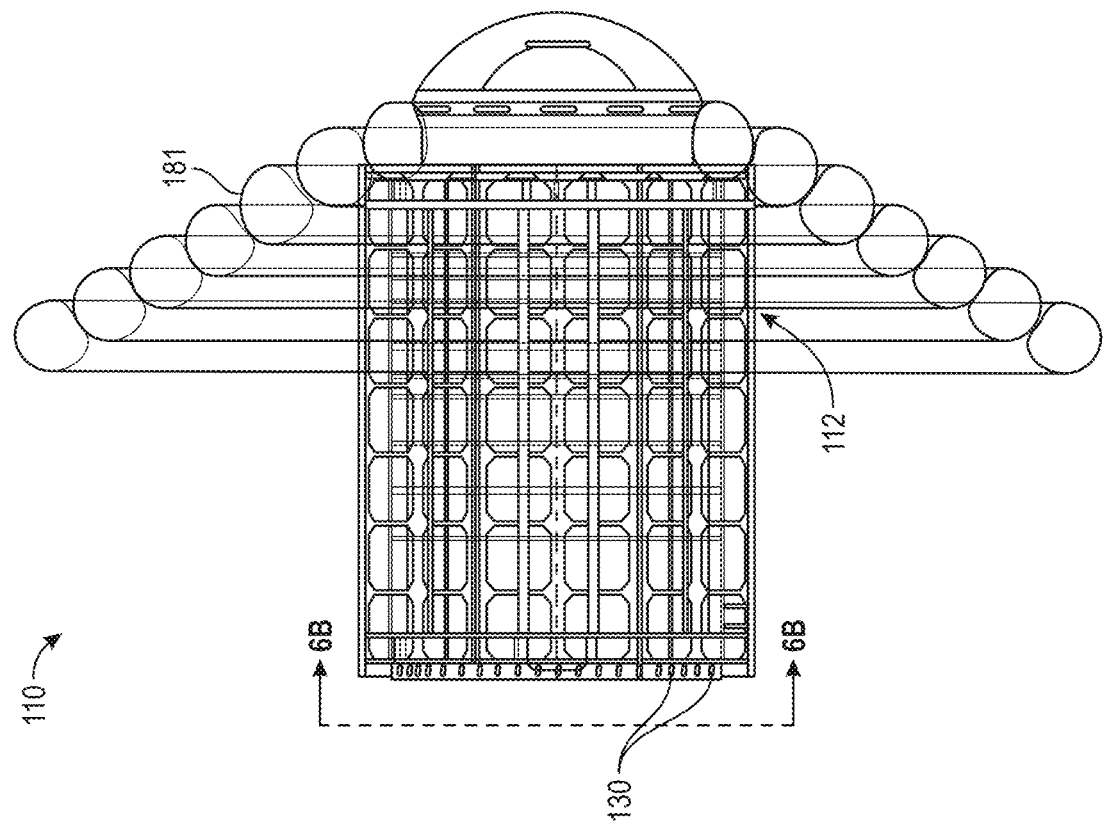
FIG. 6A
FIG. 6B

SPACE VEHICLES WITH PARAGLIDER RE-ENTRY, AND ASSOCIATED SYSTEMS AND METHODS

CROSS-REFERENCE TO RELATED APPLICATION

The present application claims priority to U.S. Provisional Application No. 63/280,567, filed on Nov. 17, 2021, and incorporated herein by reference.

TECHNICAL FIELD

The present technology is directed generally to space vehicles, e.g., satellites, with paraglider re-entry features, and associated systems and methods.

BACKGROUND

Satellites have been used for many decades to perform useful missions in space, including in Earth orbit. One drawback with existing satellite technologies is that satellites carry only a limited amount of fuel, and/or other expendables while on a mission. A further drawback is that satellites and other space missions create debris in space. Accordingly, there remains a need for satellites that can return to Earth for refurbishment, refueling, and/or to aid in returning space debris to Earth.

BRIEF DESCRIPTION OF THE DRAWINGS

FIGS. 6A-6C illustrate representative views of a space vehicle having an inflatable heat shield, in accordance with embodiments of the present technology.

DETAILED DESCRIPTION

Figure 1A:
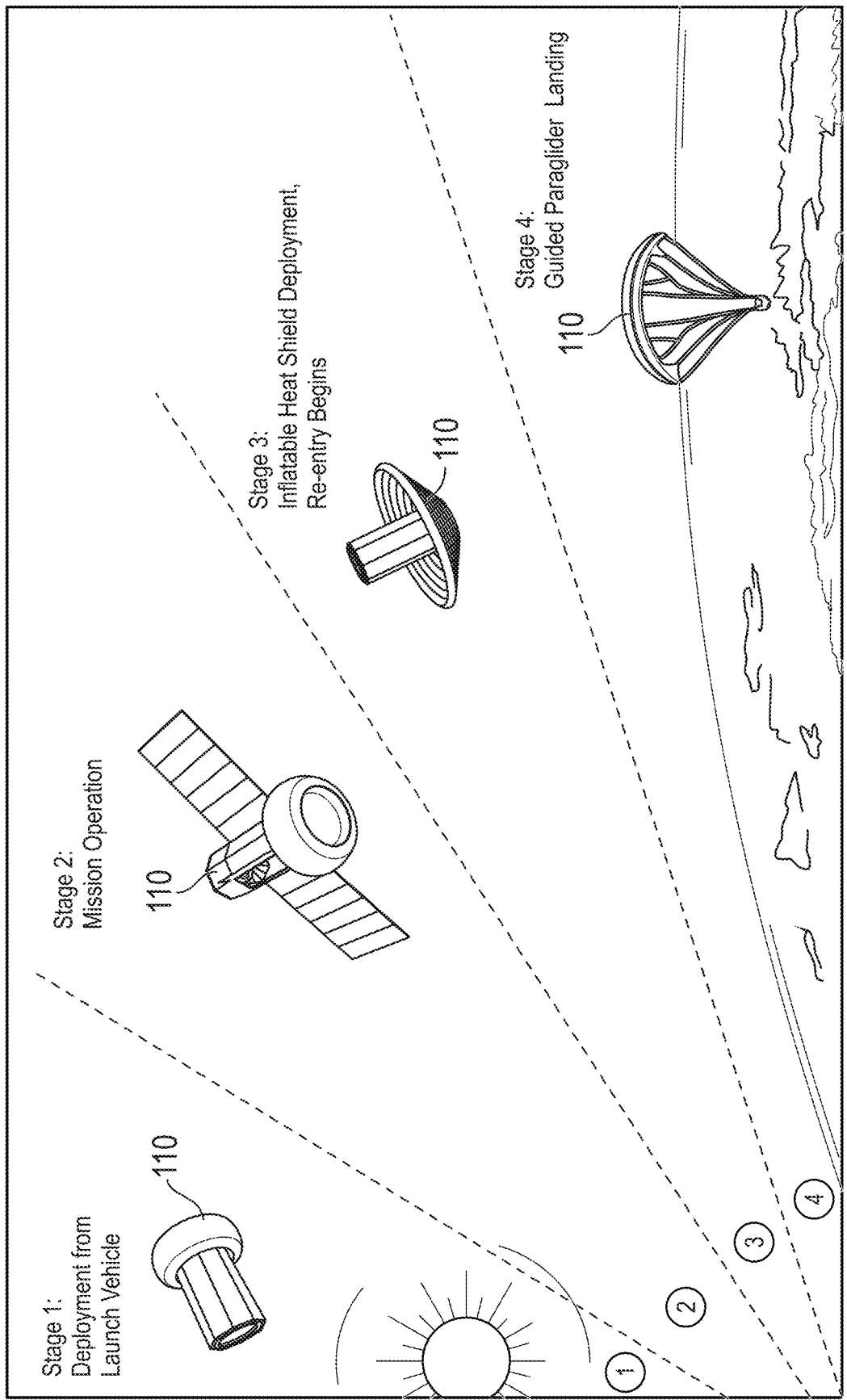
FIG. 1A is a partially schematic, isometric illustration of a space vehicle (e.g., a satellite) undergoing several phases of a mission, in accordance with representative embodiments of the present technology.

The present technology is directed generally to space vehicles (e.g., satellites) having deployable flexible, inflatable wings (e.g., paraglider wings) for returning to Earth, and associated systems and methods. Space vehicles configured in accordance with embodiments of the present technology can be launched into space to carry out one or more missions, and can return to Earth under the support, control, and/or guidance of the inflatable wing. Once on Earth, the space vehicle can be refurbished, refueled, and/or otherwise re-outfitted for further missions. This cycle can be repeated multiple times, allowing the space vehicle to have a much longer useful life than conventional satellites. In addition, such space vehicles can be used to bring materials back to Earth. For example, in representative embodiments, such space vehicles can be used to return space debris to Earth.

Specific details of several embodiments of the technology are described below with reference to selected configurations to provide a thorough understanding of these embodiments, with the understanding that the technology may be practiced in the context of other embodiments. Several details describing structures and/or processes that are well-known and often associated with other types of space vehicles and/or associated systems and components, but that may unnecessarily obscure some significant aspects of the present disclosure, are not set forth in the present description, for purposes of clarity. Moreover, although the following disclosure sets forth several embodiments of different aspects of the technology, several other embodiments of the technology can have configurations and/or components that differ from those described in this section. As such, the technology may have other embodiments with additional elements and/or without several of the elements described below with reference to FIGS. 1-9D.

Many embodiments of the technology described below may take the form of computer- or machine- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

Figure 1B:
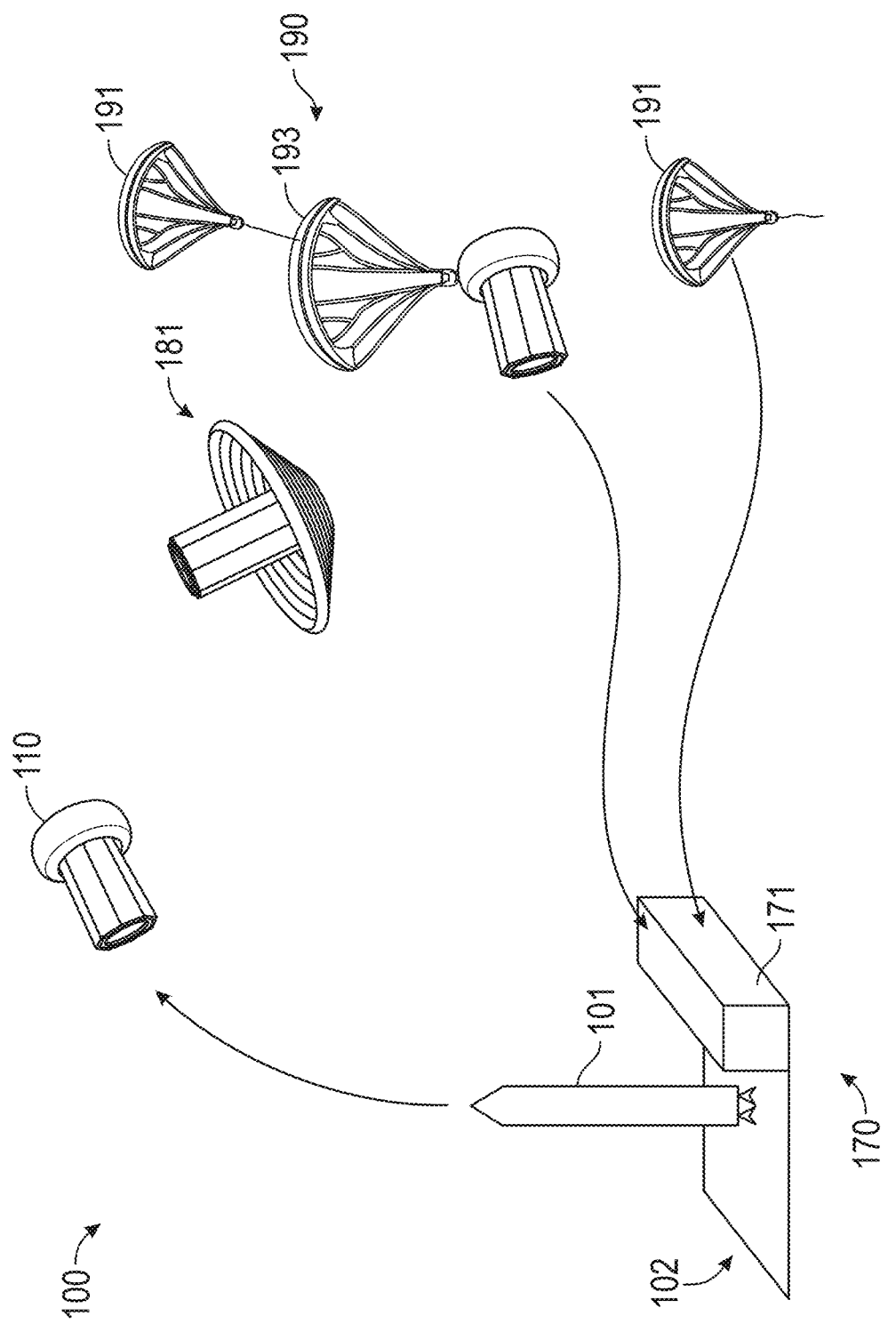
FIG. 1B is a partially schematic illustration of an overall re-useable cycle for a space vehicle, including launch, recovery, and refurbishment, in accordance with embodiments of the present technology.

FIGS. 1A and 1B schematically illustrate a representative mission for satellite carried out in accordance with the present technology. Referring first to FIG. 1A, a representative space vehicle 110, for example, a satellite, is shown in a first stage after having been deployed from a launch vehicle. In Stage 2 of FIG. 1A, the space vehicle 110 carries out a mission. For example, the mission can include a sensing mission, an observation mission, a space debris collection mission, and/or any other suitable mission. At Stage 3, the space vehicle 110 inflates a deployable re-entry heat shield, in preparation for re-entering the Earth's atmosphere. At Stage 4, the space vehicle 110 deploys a paraglider, or other inflatable wing, so as to glide back to Earth.

As used herein, the term paraglider refers generally to a type of inflatable/collapsible wing. A paraglider differs from a parachute in that a parachute slows descent, but provides little or no lateral maneuverability. A paraglider differs from a parafoil in that a paraglider typically has a higher glide ratio than a parafoil, which supports a greater lateral travel range and a greater level of lateral maneuverability. For example, a paraglider typically has a glide ratio of greater than 4:1. The inflatable cells of a paraglider typically have different geometries (e.g. different sizes and/or shapes) over the span of the paraglider wing. The speed capability/range of a paraglider differs from those of a parafoil due to these factors and as a result, the paraglider can be deployed at higher altitudes and fly further distances than a parafoil.

FIG. 1B schematically illustrates additional elements of the overall cycle carried out by the space vehicle 110, as well as the stages described above with reference to FIG. 1A. For example, the overall system 100 can include a launch site 102 from which a launch vehicle 101 is directed into space. The launch vehicle 101 carries the space vehicle 110 and deploys it, e.g., at or near a suitable orbital insertion point. After the space vehicle 110 completes its mission, it deploys an inflatable heat shield 181. Upon re-entering the Earth's atmosphere, the space vehicle 110 can deploy a re-entry system 190, which in turn can include an initially-deployed drogue chute 191, that deploys a paraglider 193 or other inflatable wing. In some embodiments, the drogue chute 191 separates from the overall landing system 190 to descend to Earth on its own, while the space vehicle 110, under the control of the paraglider 193, returns to Earth. In at least some embodiments, the space vehicle returns to Earth at or near the launch site 102. The space vehicle can land on any of a variety of suitable terrestrial sites, including land-based sites, water-based sites, and/or air-based sites. Representative land-based sites include the ground, a platform, a building, a net, a land-based vehicle, and/or other suitable land-based surfaces. Representative water-based sites include a fresh-water or salt-water surface, a floating platform, an aircraft carrier, a barge, another water-based vehicle, and/or another suitable water-based surface. Representative air-based sites include a mid-air location at which a helicopter or other airborne vehicle captures the space vehicle, e.g., by snagging it. In any of these embodiments, the overall system 100 can further include a ground system 170 (also land or water based), which, in some embodiments, includes an assembly/refurbishment facility 171. At the assembly/refurbishment facility 171, the space vehicle 110 is refurbished, and returned to the same or a different launch vehicle 101 for a new mission.

FIGS. 2A-7C illustrate a representative space vehicle 110 configured in accordance with several embodiments of the present technology. For purposes of illustration in the following Figures, several elements may be eliminated in order to provide visibility for other elements. Accordingly, it will be understood that, although several of the Figures discussed below appear to show incomplete space vehicles, selected elements are absent solely to enhance the reader's ability to understand other specific features of the overall system.

Figure 2A:
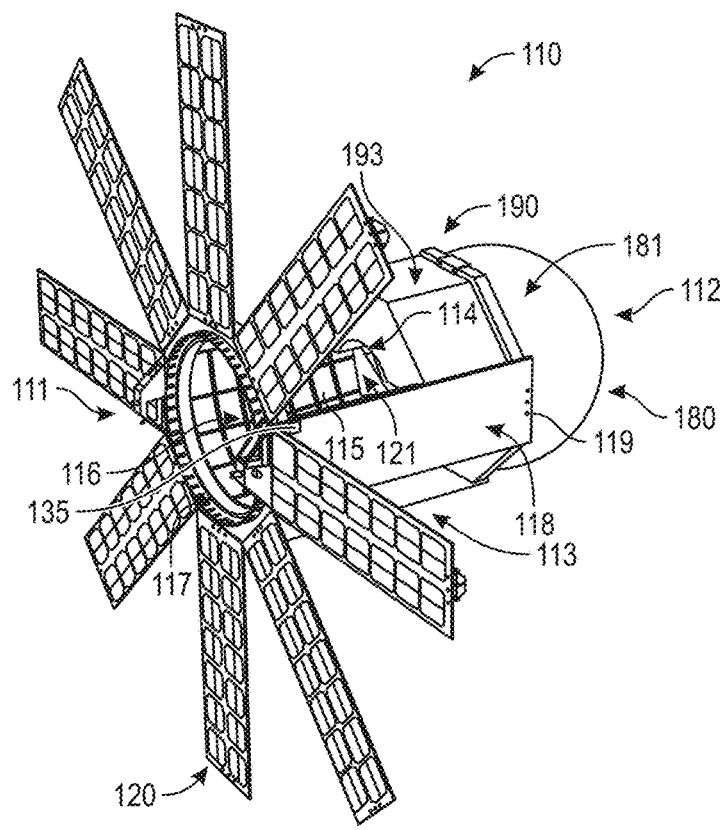
FIGS. 2A and 2B illustrate a representative space vehicle configured in accordance with embodiments of the present technology, with solar panels in a deployed configuration for executing a mission (FIG. 2A), and a heat shield in a deployed configuration for return to Earth (FIG. 2B).

FIG. 2A is a partially schematic, isometric illustration of a representative space vehicle 110, configured in accordance with embodiments of the present technology. The space vehicle 110 can include a first end portion 111, a second end portion 112, and a central portion 113 positioned between the first and second end portions 111, 112. The space vehicle 110 can include a payload bay 114, e.g., positioned at the central portion 113. The payload bay 114 can include one or more payload apertures, for example, a first payload aperture 115, and a second payload aperture 116. The first payload aperture 115 is located at the central portion 113, and the second payload aperture 116 is located at the first end portion 111.

Figure 2B:
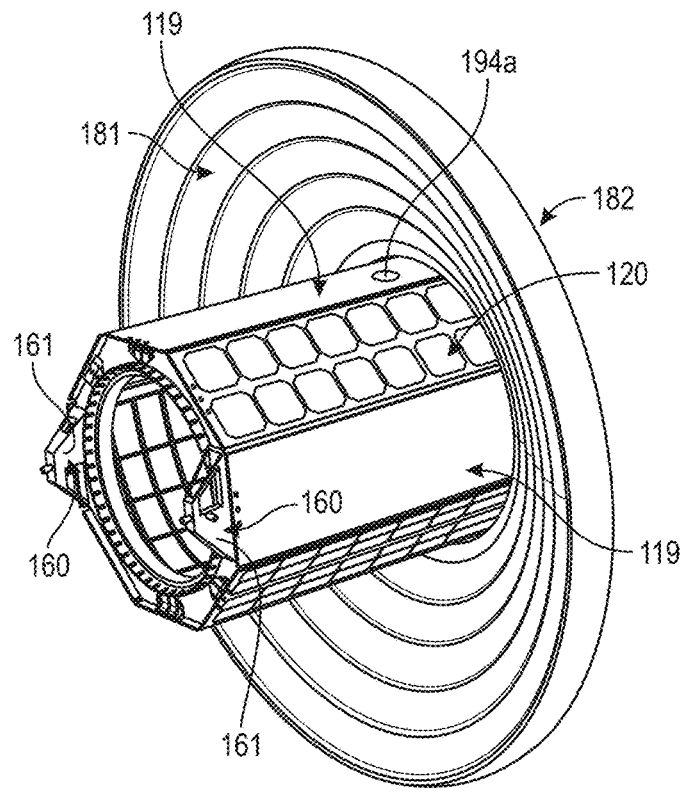

The space vehicle 110 can include one or more structural panels 119 that provide structure for the overall vehicle, and can further include one or more solar panels 120 to collect energy for operating space vehicle systems, including a propulsion system 160 (shown in FIG. 2B). When in space and on-mission, the solar panels 120 can be deployed outwardly from the space vehicle 110, as shown in FIG. 2A. The solar panels 120 can be stowed alongside the central portion 113 of the space vehicle during re-entry. One or more actuators 135 (one is shown schematically in FIG. 2A) can move the solar panels between the stowed and deployed positions, under the directed of a vehicle controller described later with reference to FIG. 3A. The space vehicle 110 can further include a radiator system 118 that directs heat, generated by components carried by the space vehicle 110, outwardly into space. In some embodiments, the radiator system 118 can be carried by the structural panels 119, the solar panels 120, and/or other suitable elements and/or structures of the space vehicle 110.

To aid in re-entry, the space vehicle 110 can include a heat shield 181 located at or toward the second end portion 112. The heat shield 181, which can form a portion of an overall re-entry system 180, can be deployed to shield the space vehicle 110 from heat encountered during re-entry. The second end portion 112 can also house the landing system 190, e.g., a deployable paraglider system 193 that guides the space vehicle 110 to the ground after re-entry.

FIG. 2B is a partially schematic illustration of the space vehicle 110 with the solar panels 120 stowed for re-entry. In addition, the heat shield 181 has been deployed in preparation for re-entry. The heat shield 181 can include a flexible thermal protection layer 182 to aid in shielding the space vehicle 110. Two first attachment elements 194a (one is shown schematically) attach the space vehicle 110 to corresponding paraglider lines during final descent. The space vehicle 110 can further include one or more propulsion modules 161 that can be used to maintain the orientation of the space vehicle 110 while en route to a mission, while on-mission, and/or to re-orient the space vehicle for re-entry toward the conclusion of the mission. Further details of the propulsion system 160 are described later.

Figure 3A:
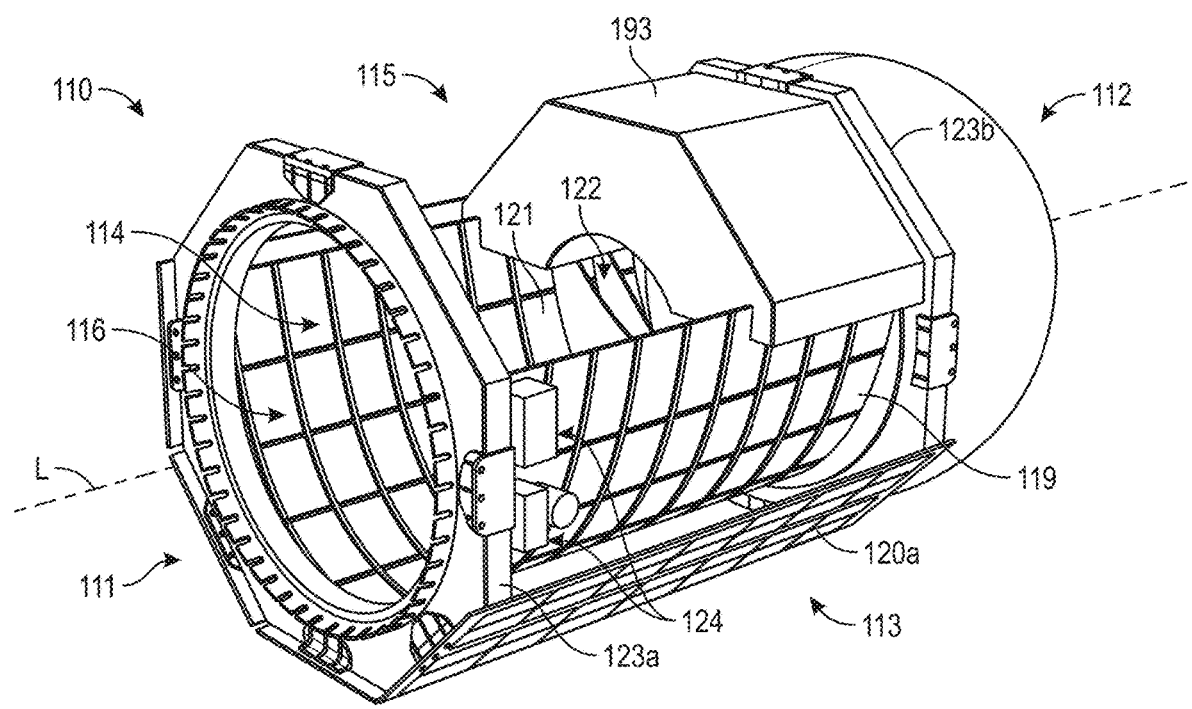
FIGS. 3A and 3B illustrate portions of a representative space vehicle configured in accordance with embodiments of the present technology.

FIG. 3A is a partially schematic illustration of the space vehicle 110, with several components removed to illustrate elements within the space vehicle 110. The space vehicle 110 can include a first bulkhead 123a at the first end portion 111, a second bulkhead 123b at the second end portion 112, and an intermediate avionics bulkhead 121, with avionics housed between the avionics bulkhead 121 and the second bulkhead 123b. The avionics carried by the space vehicle 110 can include a vehicle controller 122 to control the operation of the space vehicle itself (e.g., propulsion and navigation operations, as well as operations for deploying and/or stowing the solar panels 120, the heat shield 181, the paraglider system 193, and/or other systems). Payload controllers 124 can control the operation of systems carried in the payload bay 114, for example, telescopes, retractable arms, and/or other systems or sensors, including systems for retrieving space debris. Further representative systems include docking systems and other rendezvous systems, magnets, telescoping booms, servos (for example, to hold or latch other elements open or closed), and/or retrieval nets.

The paraglider system 193, shown in its stowed state, is positioned adjacent to the second bulkhead 123b. The payload bay 114 is housed between the first bulkhead 123a and the second bulkhead 123b. Structural panels 119, which extend lengthwise along a longitudinal axis L of the space vehicle 110, can be mounted between the two bulkheads 123a, 123b to support the overall structure of the space vehicle. FIG. 3A further illustrates a representative stowed or fixed solar panel 120a, which is also aligned along the longitudinal axis L.

Figure 3B:
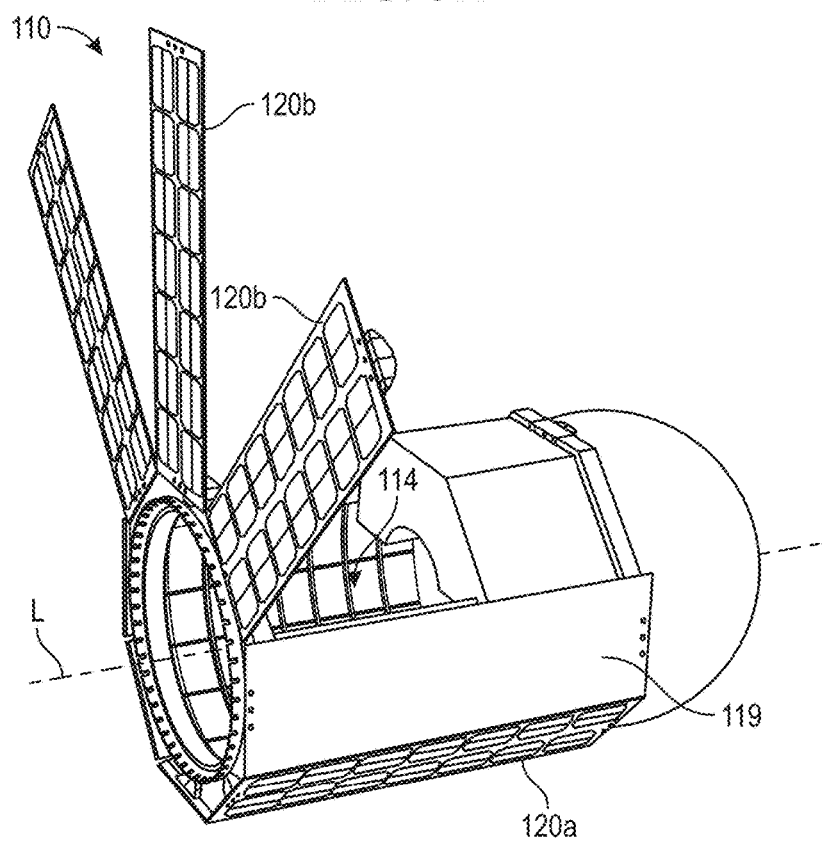

FIG. 3B illustrates an embodiment of the space vehicle 110 with one or more fixed solar panels 120a positioned parallel to the longitudinal axis L, radially outwardly from the corresponding structural panels 119. As is also shown in FIG. 3B, one or more deployable solar panels 120b can operate both to provide power during the mission of the space vehicle 110 and to provide access to the payload bay 114. Accordingly, the deployable solar panels 120b can operate both as solar panels and as doors for the payload bay 114.

In an embodiment shown in FIG. 3B, individual deployable solar panels 120b hinge along an axis that is transverse to the longitudinal axis L of the space vehicle 110. In other embodiments, the deployable solar panels 120b can have other arrangements for deployment and for stowing. For example, referring now to FIG. 4A, the space vehicle 110 can include a deployable solar panel 120b that includes multiple segments 125, e.g., six segments identified as segments 125a-125f. The deployable solar panel 120b is shown in its deployed position in FIG. 4A. To stow the deployable panel 120b, the first three segments 125a-125c are pivoted as a unit about a first axis 127a (e.g., parallel to the longitudinal axis L), to overlie over the second three segments 125d-125f, as indicated by arrow A. The folded assembly is then rotated about a second axis 127b, as indicated by arrow B, to fold the corresponding overlaid segments against three corresponding edges 128a, 128b, 128c of the bulkheads 123a, 123b. Accordingly, the first and sixth segments 125a, 125b are folded against a first edge 128a, the second and fifth segments 125b, 125e are folded against a second edge 128b, and the third and fourth segments 125c, 125d are folded against a third edge 128c. In particular embodiments, the deployable solar panel 120b can be deployed and stowed using any number of suitable mechanisms. For example, the joints between adjacent segments can be spring-loaded, and biased toward a deployed position. A cable or multiple cables can be reeled in to re-fold the segments to the stowed position.

Figure 4A:
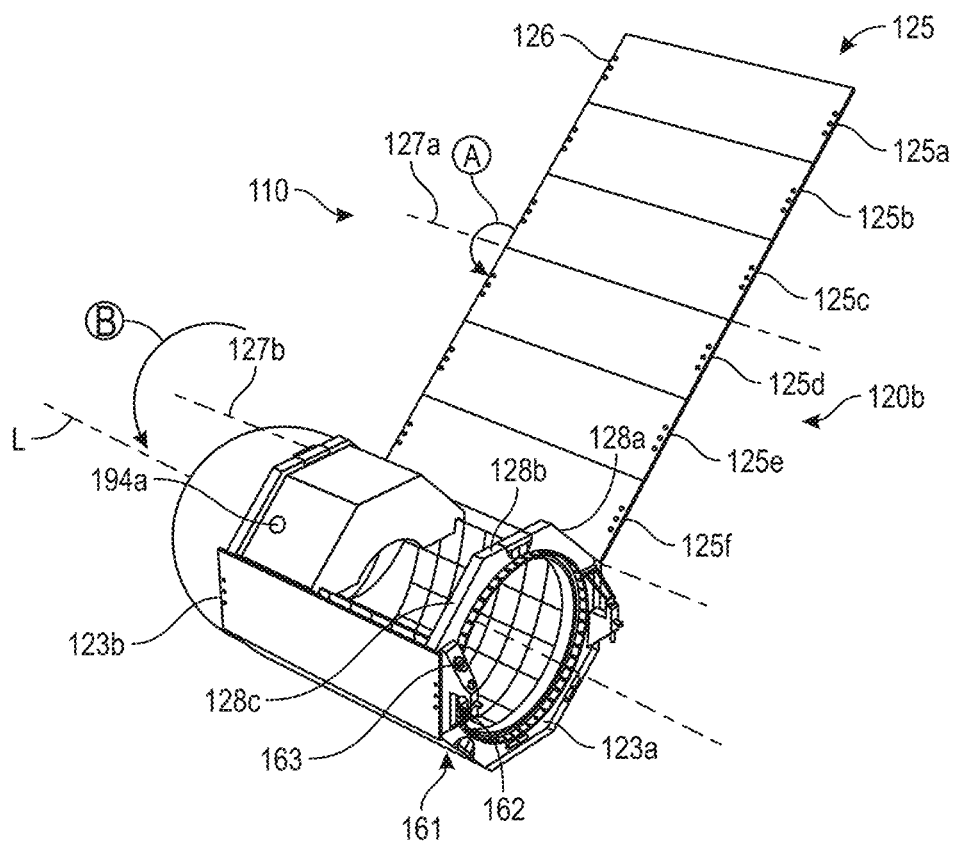
FIGS. 4A and 4B illustrate a representative technique for deploying a space vehicle solar panel, in accordance with embodiments of the present technology.

FIG. 4A also illustrates in greater detail a representative one of the propulsion modules 161. The propulsion module 161 can include one or more vernier thrusters 162, and one or more ACS thrusters 163. The vernier thrusters 162 can be used to impart small, precise position and orientation adjustments to the space vehicle 110, and the ACS thrusters 163 can be used to provide larger scale movements, e.g., to position the space vehicle 110 for re-entry and/or other maneuvers.

Figure 4B:
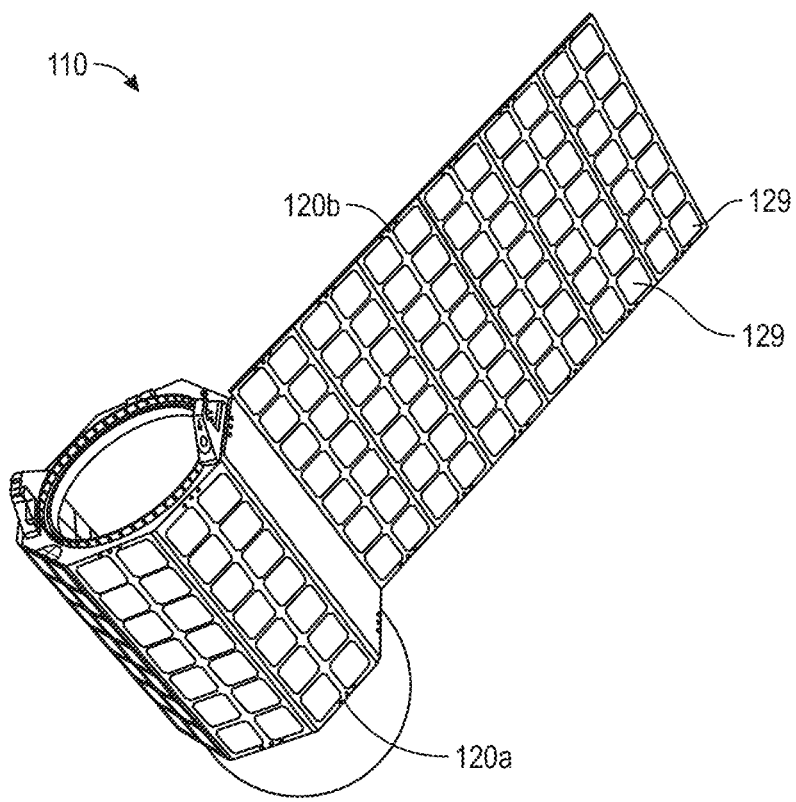

FIG. 4B is a partially schematic illustration of an embodiment of the space vehicle 110 shown in FIG. 4A, illustrating solar collection elements 129 (e.g., solar cells and/or groups of cells) carried by the deployable solar panel 120b, and a plurality of fixed solar panels 120a. In other embodiments, the fixed solar panels 120a can be replaced with a second deployable solar panel 128b that operates in a manner similar to the deployable arrangement as discussed above with reference to FIG. 4A. Each deployable solar panel 120b can accordingly extend in a direction generally opposite that of that of the other.

Figure 5A:
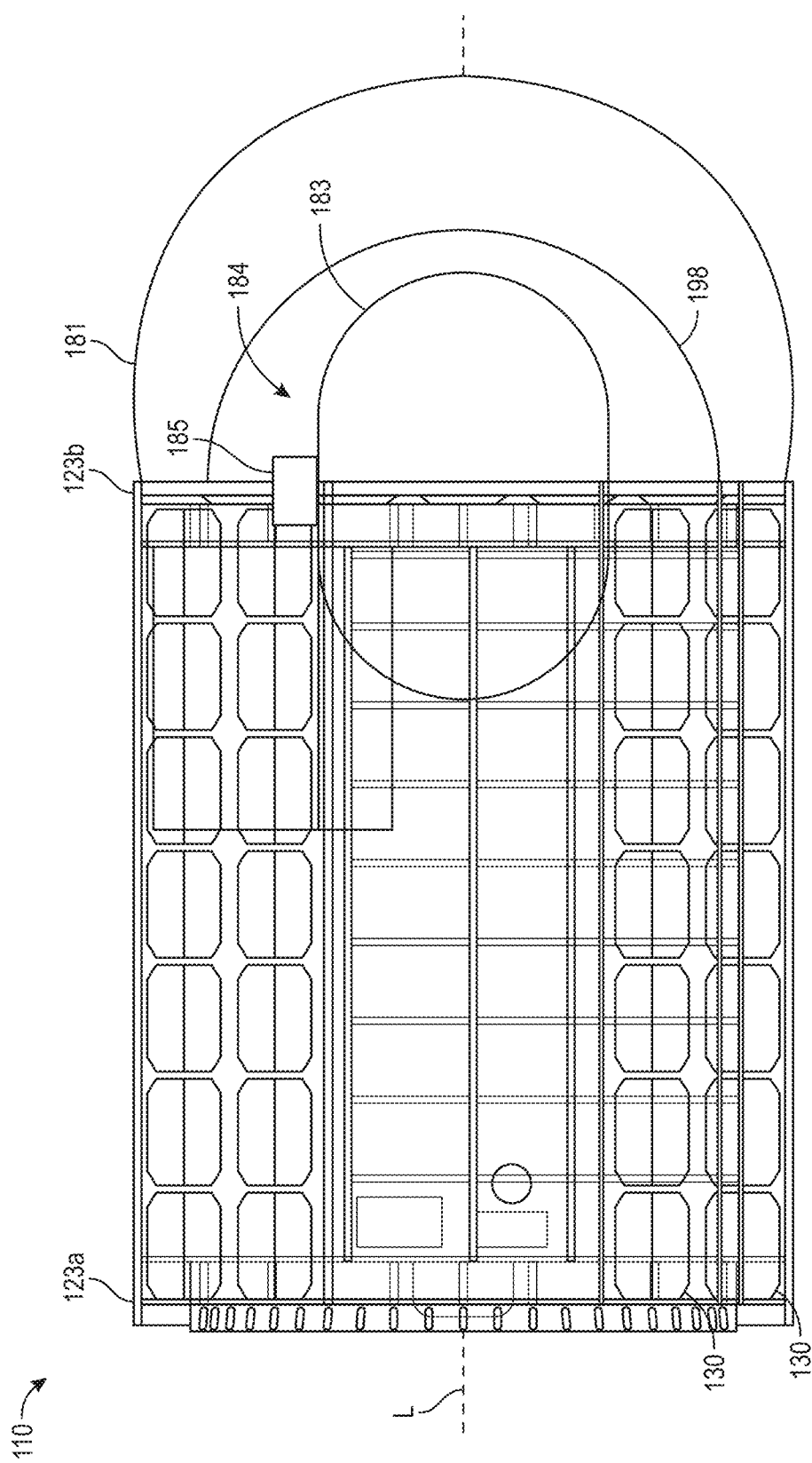
FIGS. 5A and 5B are partially schematic, cross-sectional illustrations of a portion of a representative space vehicle, illustrating a pressurant tank, and a paraglider system, configured in accordance with embodiments of the present technology.
Figure 5B:
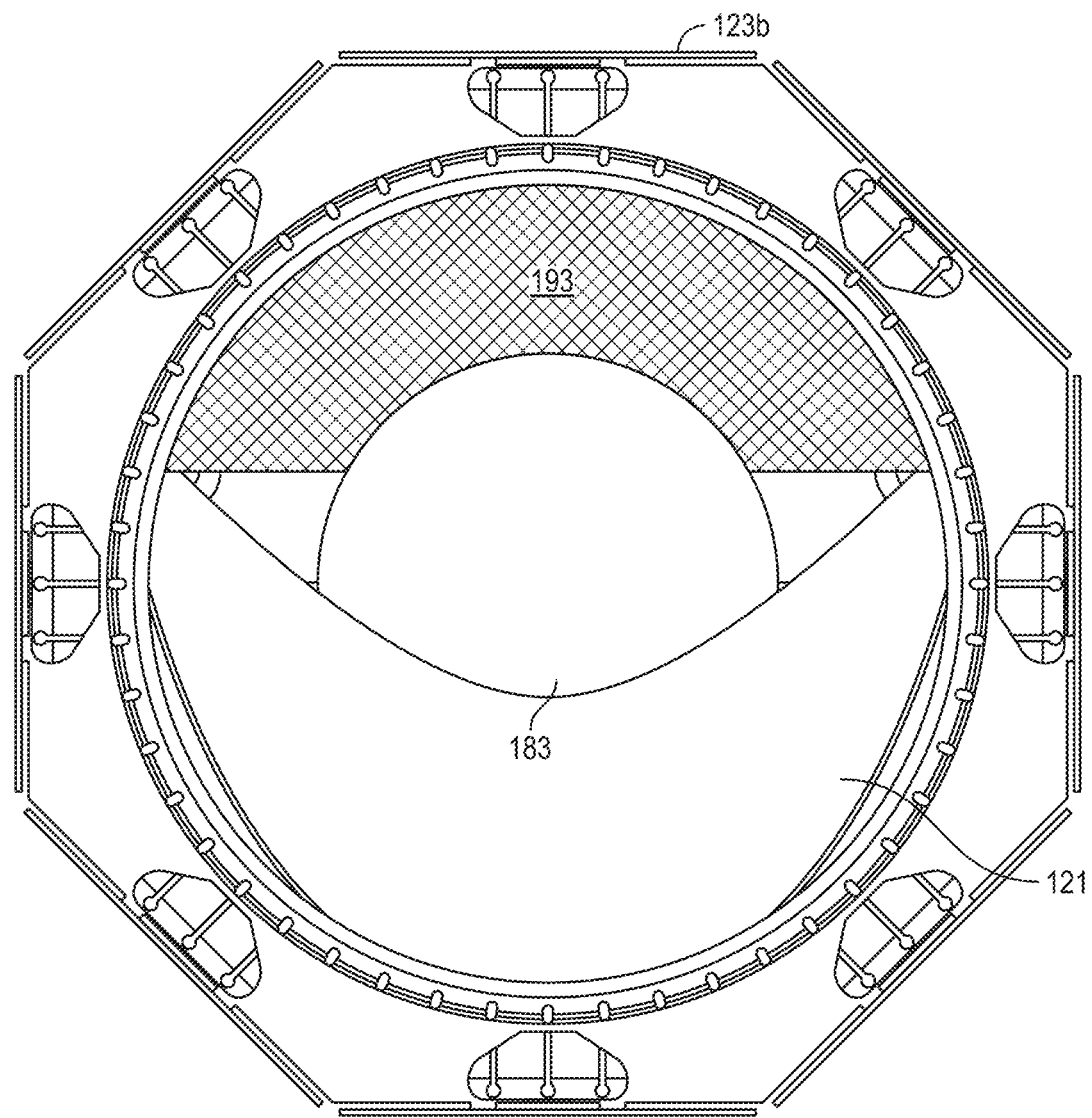

FIG. 5A is a partially schematic illustration of a representative space vehicle 110 having a plurality of longitudinal structural elements 130 that extend along the longitudinal axis L of the space vehicle 110, and provide structural support, together with the bulkheads 123a, 123b. As is also shown in FIG. 5A, the space vehicle 110 can include an inflator 184 operatively coupled to the heat shield 181 to deploy it. For example, the inflator can include gas-tight pressurant tank 183 that supplies a pressurized gas to the heat shield 181, an on-board gas generator 185, and/or another suitable gas source to deploy the heat shield. Representative gases for such a cold-gas system include nitrogen, hydrogen, and/or argon, with nitrogen and hydrogen particularly suitable as gas generator products. The pressurant tank can also supply gas for the propulsion system 160, which can also operate via a cold (non-combusting) gas. The heat shield includes a nose cone 198, with the flexible material forming the bulk of the heat shield being folded forward and packaged around the nose cone 198. FIG. 5B is a partially schematic end view of the space vehicle 110 shown in FIG. 5A, illustrating the avionics bulkhead 121, the pressurant tank 183, and the stowed paraglider system 193.

Figure 6C:
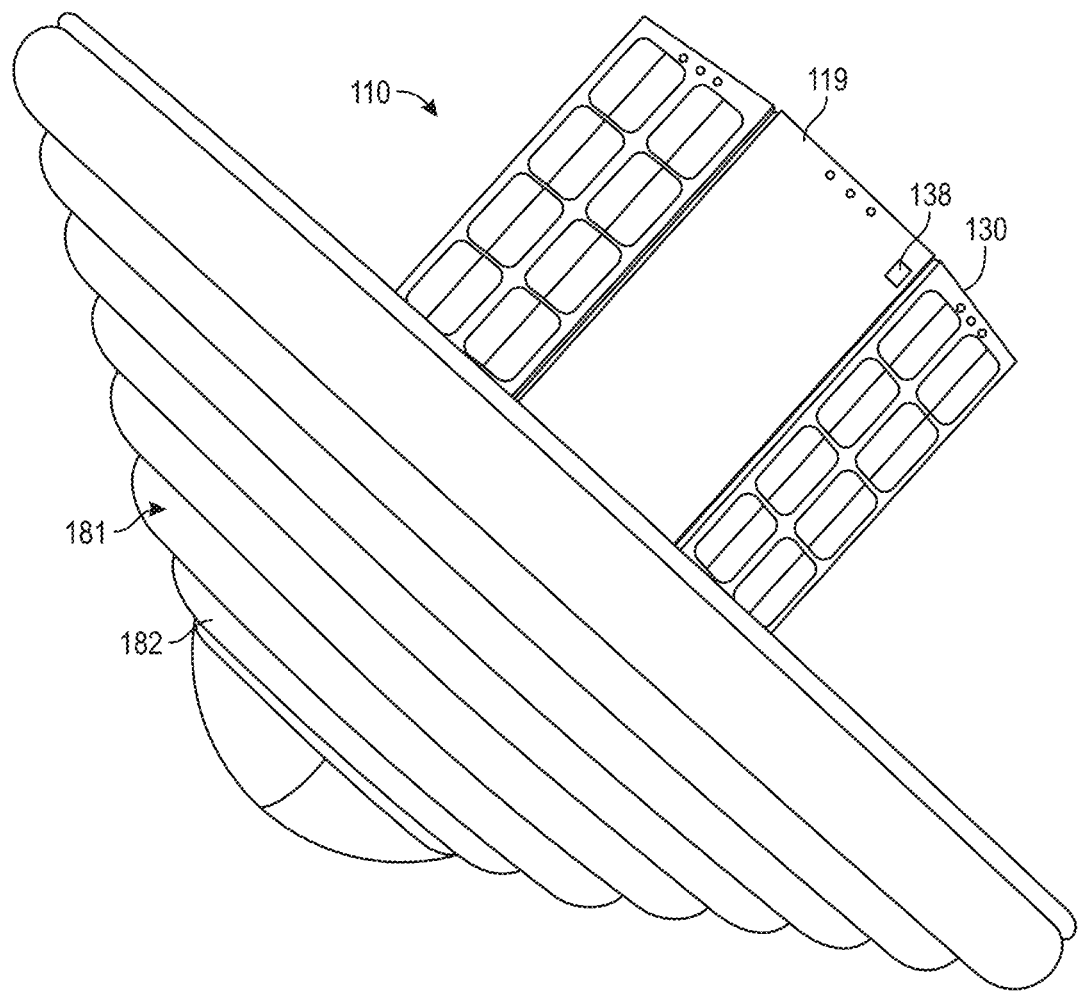

FIGS. 6A-6C illustrate a representative space vehicle 110 with the heat shield 181 in a deployed configuration. FIG. 6A is a partially schematic, partially broken-away view of the space vehicle 110, illustrating the longitudinal structural elements 130 and the inflated heat shield 181. As shown in FIG. 6A, the heat shield 181 can include a plurality of annular elements, each of which can include one or more inflatable cells, and which together form a generally conical shell toward the second end portion 112 of the space vehicle 110. This arrangement shields the space vehicle 110 as it descends through the atmosphere, with the second end portion 112 facing at least partially downwardly.

FIG. 6B is a partially schematic end view of the space vehicle 110 taken generally along a line 6B-6B of FIG. 6A, illustrating the second bulkhead 123b, the avionics bulkhead 121, the pressurant tank 183, and the deployed heat shield 181.

FIG. 6C illustrates the space vehicle 110 with the heat shield 181 deployed, and with the outwardly facing thermal protection layer 182 positioned to protect the remainder of the heat shield 181 and the space vehicle 110 from re-entry heat loads. Representative materials for the heat shield 181 include Sigratherm KFA-5, Hi-Nicalon SiC, Zylon Webbing, silicon carbide. aerogel, carbon felt, Nextel 440 BF-2 (e.g., 20 mil), Kapton (e.g., from about 0.5 mil to about 1.0 mil), Pyrogel 3350, Nextel 312 AF-14 (e.g., 14 mil), Kevlar (e.g., 5 mil), silicone-coated Kevlar (e.g., 7-13 mil), and/or silicone-coated Zylon (e.g., 7-13 mil).

The space vehicle 110 can further include photogrammetry and/or other visualization instrumentation 138 (shown schematically in FIG. 6C) e.g., one or more cameras, to assess the inflation of the heat shield 181 and further inflate, deflate, and/or otherwise control the heat shield in real-time. Accordingly, the visual sensor can monitor the heat shield when the heat shield is in its deployed state, stowed state, and/or any intermediate state. Information obtained via these instruments can also be used to guide the refurbishment process, described further below with reference to FIG. 8. The foregoing instruments can also be used to assess the performance and condition of the landing system (e.g., the paraglider) during descent, and again, can be used to guide refurbishment efforts after the space vehicle has landed.

Figure 7A:
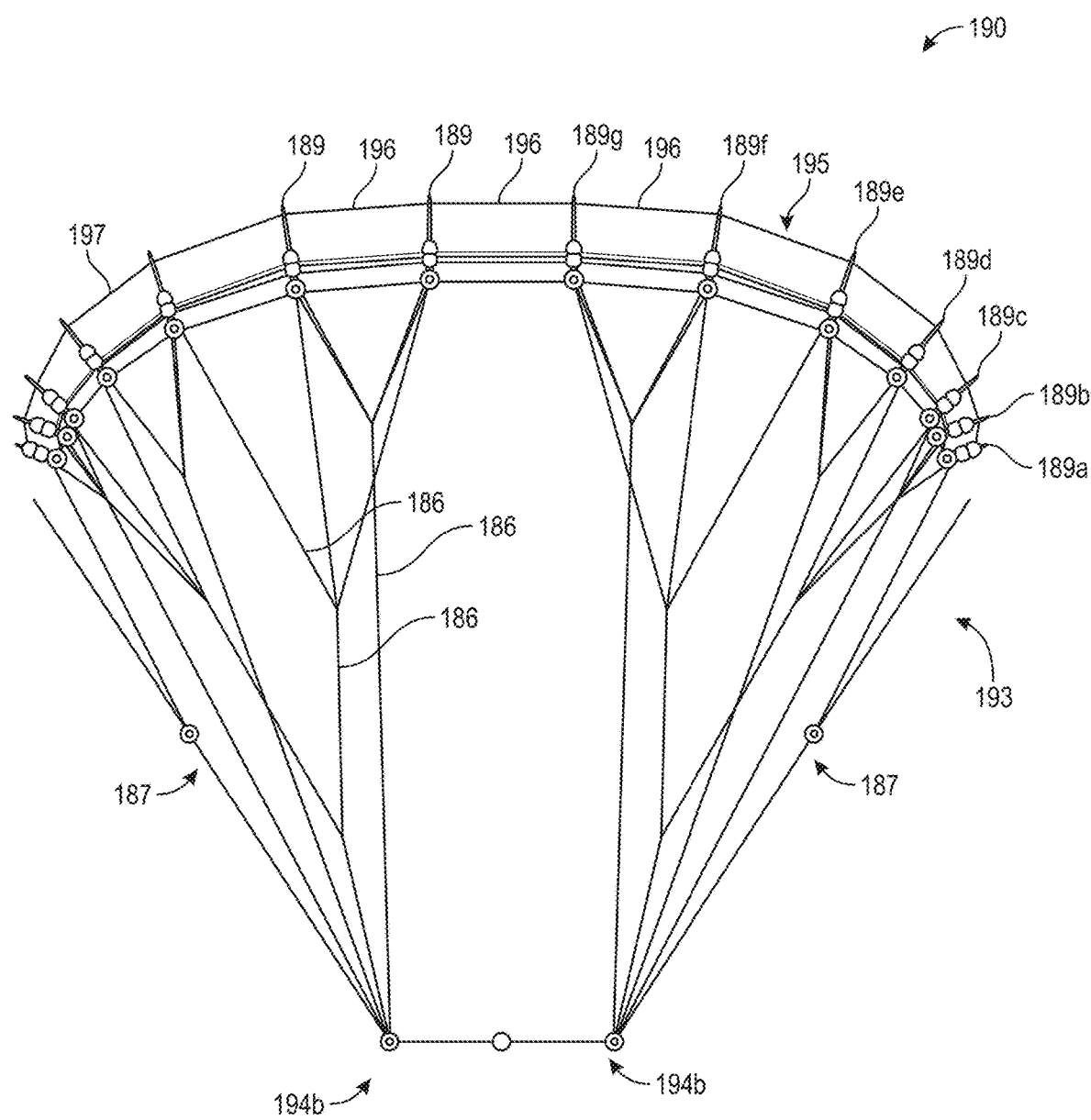
FIGS. 7A and 7B illustrate, partially schematically, a re-entry system configured to return a space vehicle to Earth in accordance with embodiments of the present technology.
Figure 7B:
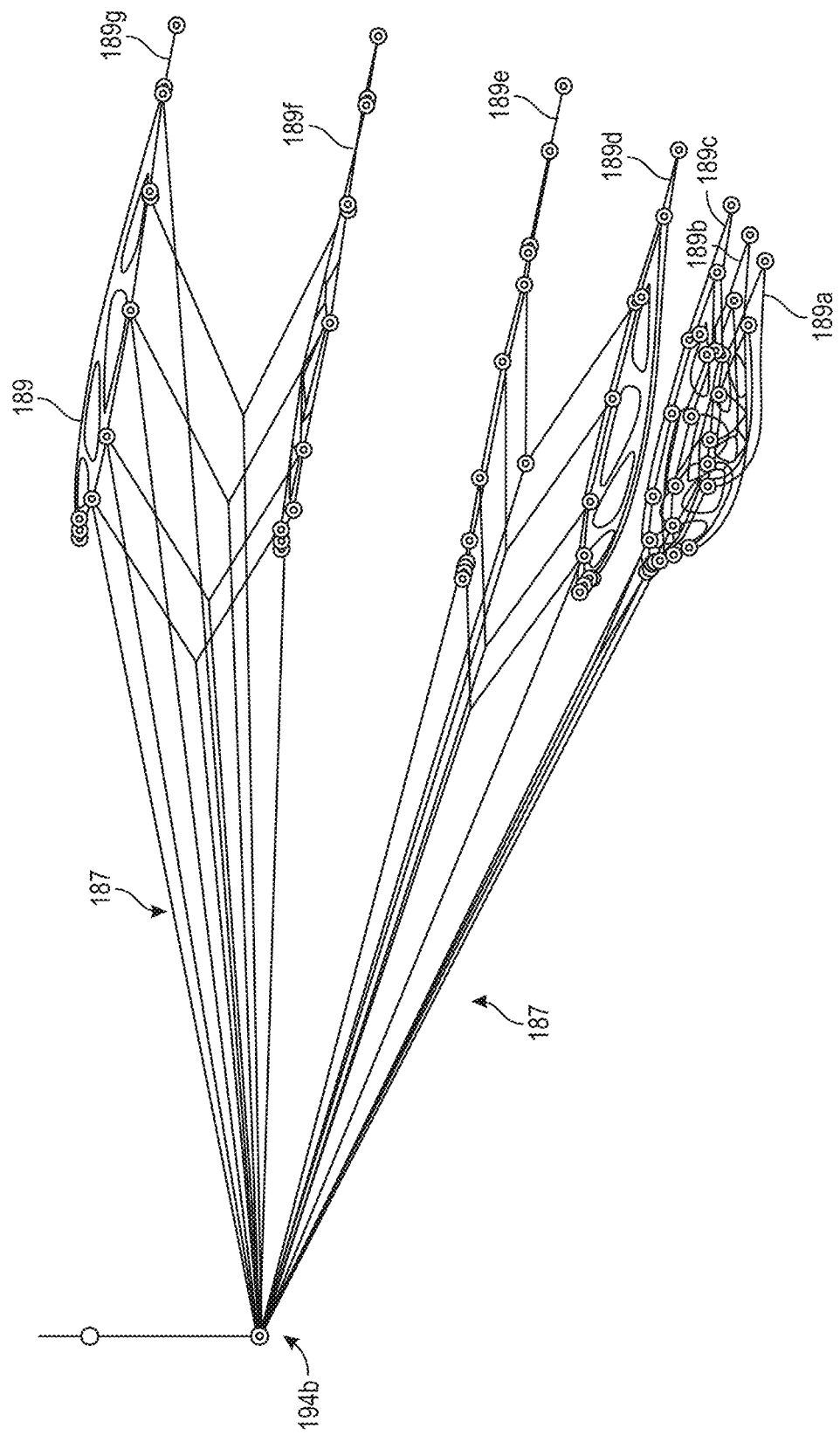
Figure 7C:
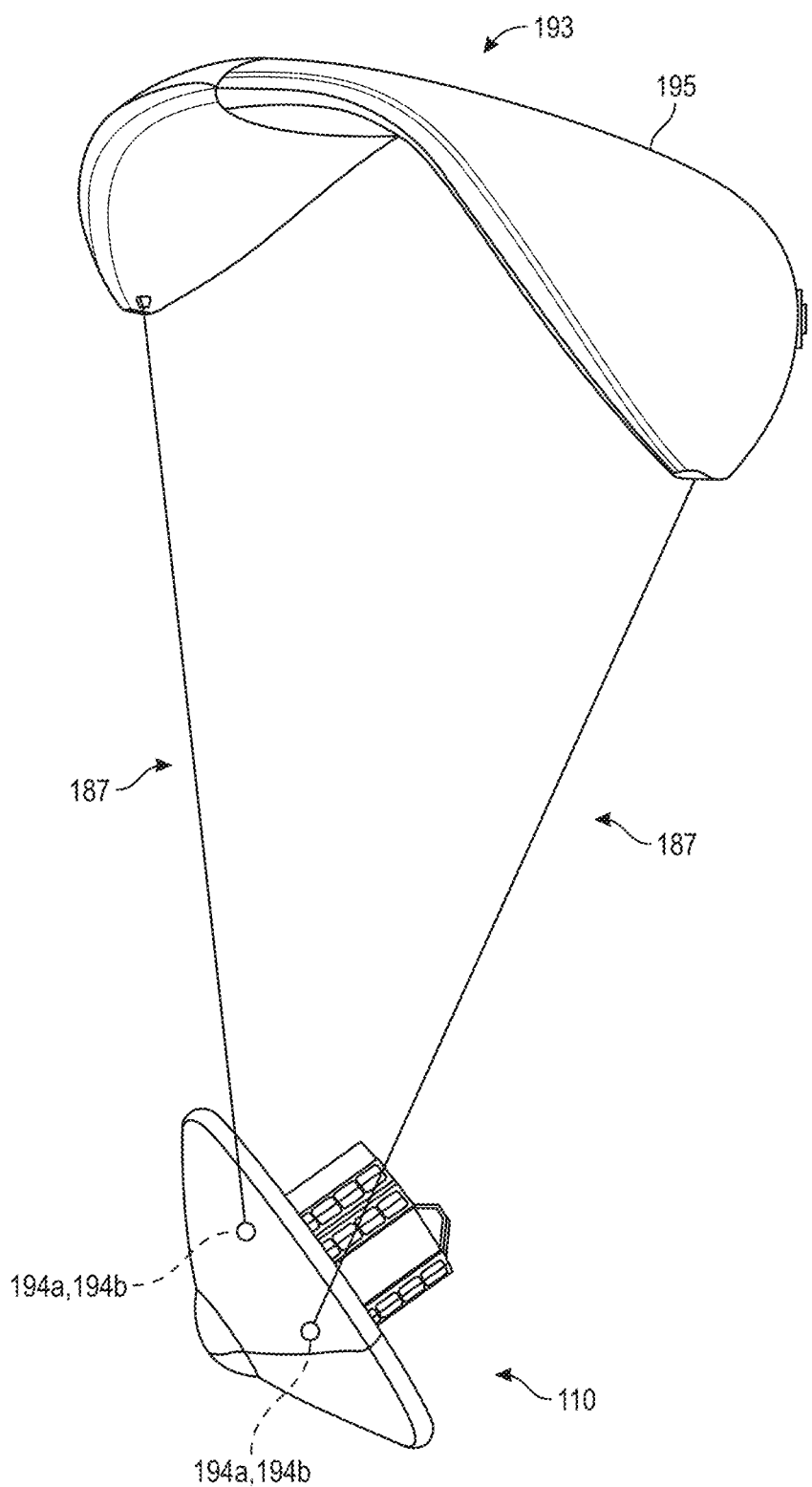
FIG. 7C illustrates a representative space vehicle carried by an inflatable wing as it descends, in accordance with embodiments of the present technology.

FIGS. 7A-7C are schematic illustrations of a representative landing system 190 of the space vehicle 110. Beginning with FIG. 7A, the landing system 190 includes a paraglider system 193 that in turn includes a wing 195 formed from multiple wing cells 196, with individual wing cells 196 separated by wing ribs 189. The wing 195 can include an aerodynamic surface 197 and can be formed from a fabric or other flexible, collapsible material that is easily compressed and compacted when stowed, and deploys under aerodynamic pressure to form a structurally semi-rigid shape suitable for creating lift sufficient to support the space vehicle 110. Representative materials include Porcher Skytex 32, Porcher Skytex 27 double coated, and Porcher 7000 (all available from Porcher Sport of La Tour-du-Pin, France), and Dominico N20D, Dominico 30, and Dominico 20 (all available from Dominico Tex Corporation of Daegu, South Korea).

In FIG. 7A, individual wing ribs are indicated by reference numbers 189*a*-189*g*. The ribs are attached to a line cascade 187, which includes individual lines 186. Accordingly, as shown in FIG. 7A, the paraglider system 193 can include two line cascade assemblies 187, one for the right half of the wing 195, and one for the left half of the wing 195. Each line cascade 187 can connect to a corresponding second attachment element 194*b* which in turn connects to the first attachment elements 194*a* described above with reference to FIG. 2B.

FIG. 7B is a partially schematic, isometric illustration of the wing ribs 189*a*-189*g*, which have a generally airfoil-type shape. In at least some embodiments, the ribs 189*a*-189*g* all have similar or identical shapes and sizes, though they appear to have different thicknesses simply by virtue of the curvature of the wing 195. In other embodiments, the airfoil shape can vary along the span of the wing 195.

FIG. 7C illustrates the space vehicle 110 with the wing 195 inflated and deployed, to guide the space vehicle 110 to its landing site. As was discussed above, a drogue parachute may be used to help withdraw, deploy, and/or inflate the wing 195, and may be subsequently separated from the wing 195 as the space vehicle 110 descends. For purposes of illustration, the details of the line cascades 187 are not shown in FIG. 7C.

In operation, the wing 195 can be deployed at altitudes above 18 kilometers, for example, 20 kilometers or above. This altitude, combined with a high glide ratio for the wing 195 (e.g., at least 5:1, and up to or greater than 12:1), can provide several advantages. For example, it can allow the space vehicle 110 to avoid weather systems, while still having sufficient range to land at its intended landing site. Alternatively, the additional range can allow the space vehicle 110 to land at a greater variety of alternate landing sites, should conditions require it.

In particular embodiments, the shape of the wing 195 can be controlled, using feedback control algorithms that deform the shape of the wing to control the descent rate and/or trajectory, of the space vehicle 110. Representative techniques for steering the wing can include servos connected to the line cascade, and/or brake fans or other suitable devices. Control algorithms can dynamically reduce the control input based on IMU limits from combined accelerations and gyroscopic sensors. In general, the space vehicle 110 deploys the wing 195 after decelerating to a subsonic Mach number, e.g., a Mach number less than 0.7, and while the space vehicle is within a target altitude window. A representative altitude window is 3 km to 30 km. Suitable sensors (e.g., flight speed sensors and altimeters can be used to identify the target parameters that trigger deployment. Deploying the paraglider can be accomplished via the drogue chute described above alone, or in combination with the heat shield. The paraglider wing 195 can also include features that prevent the lines comprising the line cascades from tangling, and/or devices configured to de-tangle lines that may have become tangled.

The overall system can include one or more of several technologies for targeting a specific landing location. For example, a radio frequency (RF) beacon can be as a homing beacon. In other embodiments, the space vehicle 110 can land in accordance with GPS-determined waypoints. In other embodiments, an optical beacon or a digital map optical reference (e.g., carried on-board) can be used, together with cameras and/other sensors to avoid hazards, and/or match detected features with corresponding features on the maps. More generally, any of the following techniques can be used alone or in combination to navigate to the landing site once the paraglider is deployed: GPS, radar altimetry, optical navigation, radio ranging, quantum compass, ground based beacon based system, and/or remote control via a human operator on the ground. In any of the foregoing embodiments, the space vehicle 110 can receive up-to-date weather information and/or any other relevant information to allow real-time or near real-time deviations from a pre-planned descent route, e.g., in an automated fashion under the control of the vehicle controller 122 (FIG. 3A). In some embodiments, the information is uploaded to the space vehicle from the ground, or downloaded from an orbiting satellite. In other embodiments, this information can be replaced or supplemented with information obtained by the space vehicle 110 itself. In any of these embodiments, the information can include weather information, as indicated above, or other information, such as changed conditions at a target landing site. Accordingly, the space vehicle can fly in accordance with primary, secondary, and tertiary safe zones, and can trigger a course correction in real-time via real-time weather (and/or other) information it collects. Any suitable technique, such as a statistical assessment of ERA5 Reanalysis data sets, can be used for jet stream and geographic path planning.

In addition to the foregoing techniques for controlling the space vehicle descent path, the space vehicle 110 can include structural components, such as small fins, small winglets, grid fins, and/or other aerodynamic surfaces. Such surfaces can be controlled to change the center of pressure of the space vehicle, and/or to control its orientation during paraglider deployment, and/or during descent. Residual cold gas from the propellant tank can be used during the descent and landing phases as well, to properly position and/or orient the space vehicle.

Figure 8:
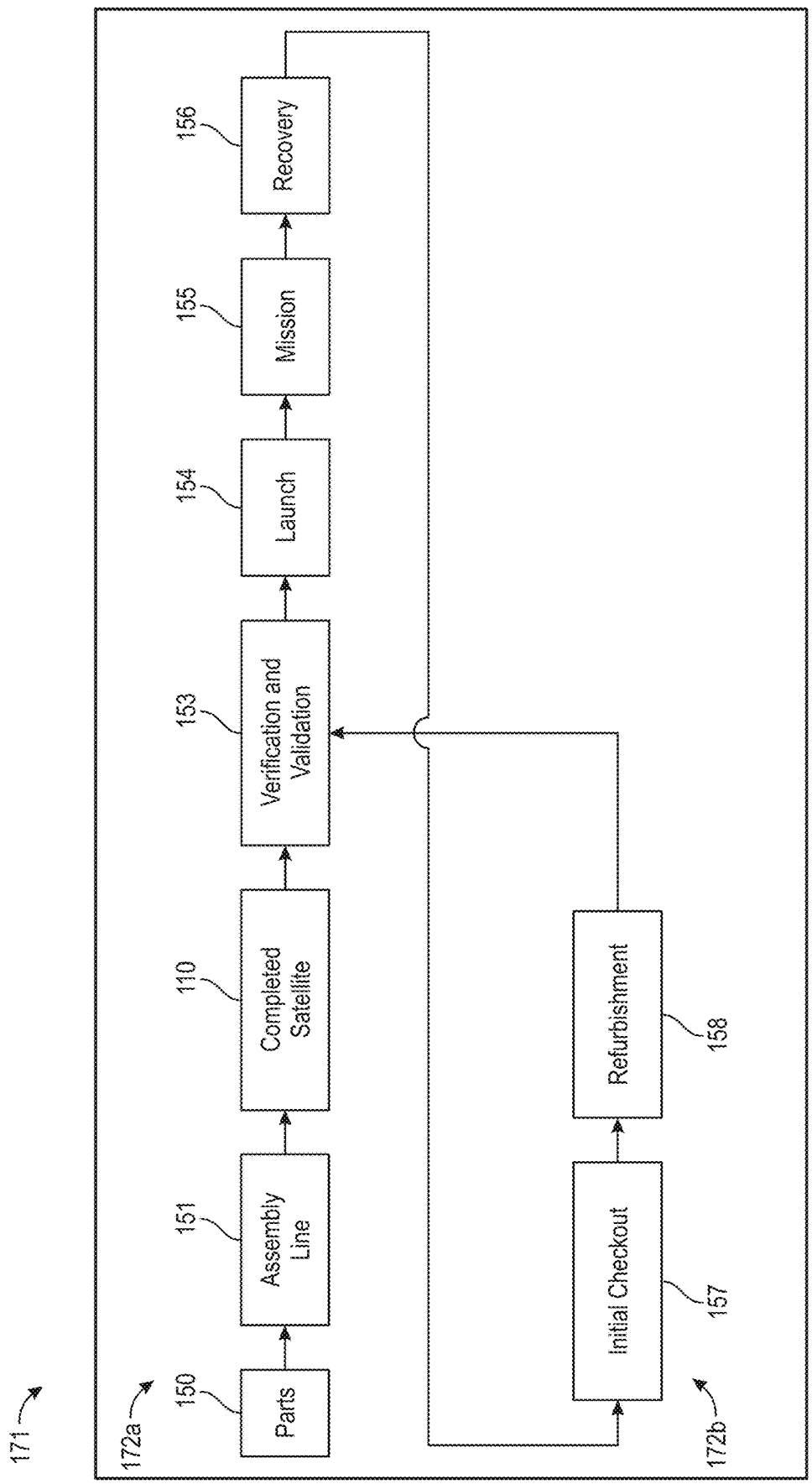
FIG. 8 is a partially schematic block diagram of an assembly/refurbishment facility, configured in accordance with embodiments of the present technology.

In at least some embodiments, the deployed heat shield 181 is collapsed before the paraglider 193 is deployed, so as to avoid interfering with the aerodynamic operation of the paraglider. For example, the heat shield 181 can be deflated and (optionally) can also be re-stowed (or partially re-stowed), or the heat shield can be detached and separately returned to the refurbishment site, described below. In other embodiments, the heat shield can operate as a descent surface, even after the paraglider 193 has been deployed. Accordingly, the heat shield 181 can aid in directing and/or slowing down the space vehicle 110. Accordingly, features of the paraglider system can be designed to account for the aerodynamic forces that result from the presence of the inflated heat shield 181 as it descends through the atmosphere FIG. 8 is a schematic block diagram of a representative assembly and/or refurbishment facility 171 that can be used to both manufacture space vehicles in accordance with the embodiments described herein, and refurbish such vehicles. Accordingly, the facility 171 can include a production line 172a and a refurbishment line 172b. The production line 172a can include one or more parts stations 150 that supply parts to an assembly line 151. The assembly line 151 produces a completed space vehicle 110. Once the space vehicle 110 has been built, all systems are verified and validated, as indicated at block 153. At block 154, the space vehicle 110 is launched via a launch vehicle, separates from the launch vehicle to perform a mission (block 155), and is recovered (block 156), as described above.

Once the space vehicle 110 has been recovered, it can be returned to the facility 171, this time at the refurbishment line 172b. The refurbishment line 172b can include an initial checkout station (block 157) and refurbishment station (block 158). For example, at the initial checkout station, the space vehicle can be evaluated for any damage, wear, and/or other issues that may need to be addressed before a subsequent mission. Suitable techniques for assessing the space launch vehicle can include EMI techniques, x-ray techniques, thermal vacuum chamber testing, and/or other non-invasive testing techniques. Representative issues that may arise as the result of such tests include micrometeorite damage, vibration damage, and/or effects of radiation fields and/or electromagnetic interference.

As a result of the need for refurbishment, the space vehicle 110 can be particularly tailored for multiple access events. In particular, elements of the space vehicle 110 can be positioned, organized, and/or arranged in a way that allows easy entry into the interior of the space vehicle, and easy access to elements of the space vehicle that may require refurbishment over the life of the vehicle. For example, the space vehicle 110 can include internal compartments that can be easily accessed via latches, quick-release mechanisms, and/or conventional fasteners. Elements of the space vehicle 110 that might otherwise be positioned in small, inaccessible spaces, are deliberately positioned for ease of access. This is unlike conventional satellites, which are typically manufactured from the inside out, and are not designed to be accessed on multiple occasions, particularly after having performed a mission.

Once the vehicle has been refurbished, it can re-enter the production line 172a at block 153 (verification and validation) to continue the cycle and carry out additional missions.

FIGS. 9A-9D illustrate a space vehicle 910 configured in accordance with further representative embodiments of the present technology. Beginning with FIG. 9A, the space vehicle 910 can include a first end portion 911 carrying a propulsion deck 964, and a second end portion 912, which carries the re-entry system 980. The propellant deck 964 can carry one or more propulsion system elements, which can be aligned along the longitudinal axis L (as well as at other locations), due to the absence of a payload bay door at the first end portion 911. The payload bay 914 is positioned at the central portion 913 between the propulsion deck 964 and the re-entry system 180 and is accessed via two opposing payload apertures 915, one of which is visible in FIG. 9A. The space vehicle 910 can include multiple deployable solar panels 920b which, alone or together with one or more door panels 931, provide electrical power to the space vehicle 910 and control access to the payload bay 914.

Figure 9A:
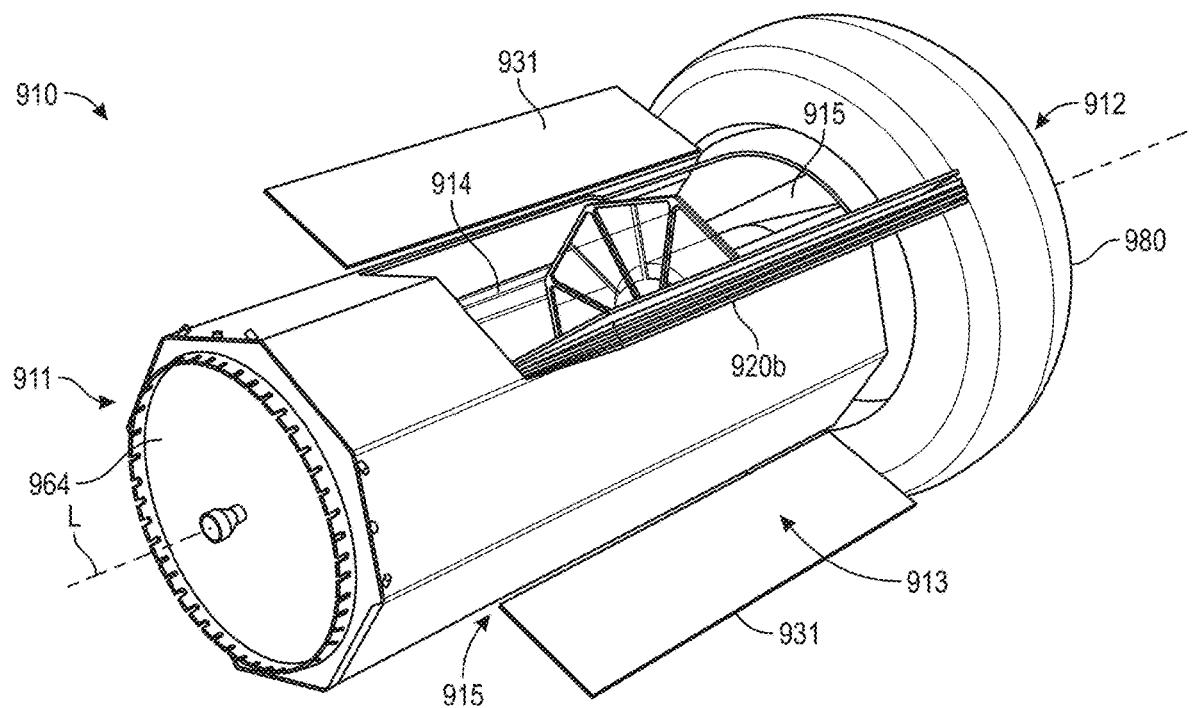
FIGS. 9A-9D illustrate a representative satellite configured in accordance with further embodiments of the present technology.
Figure 9B:
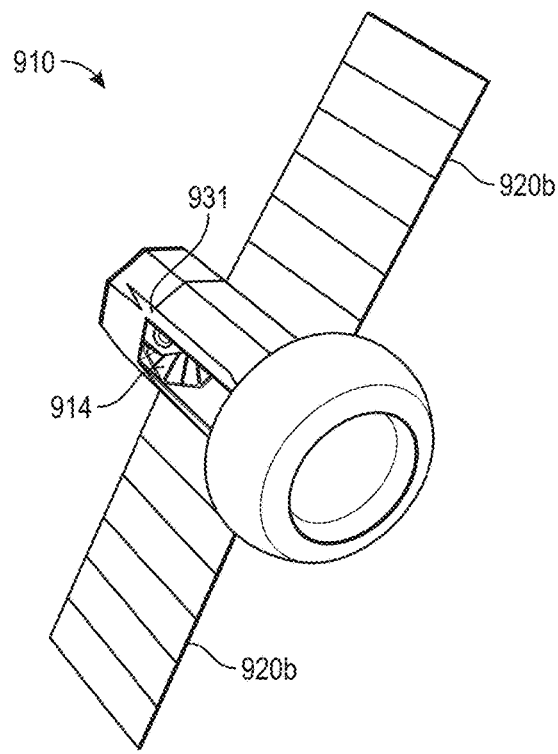
Figure 9C:
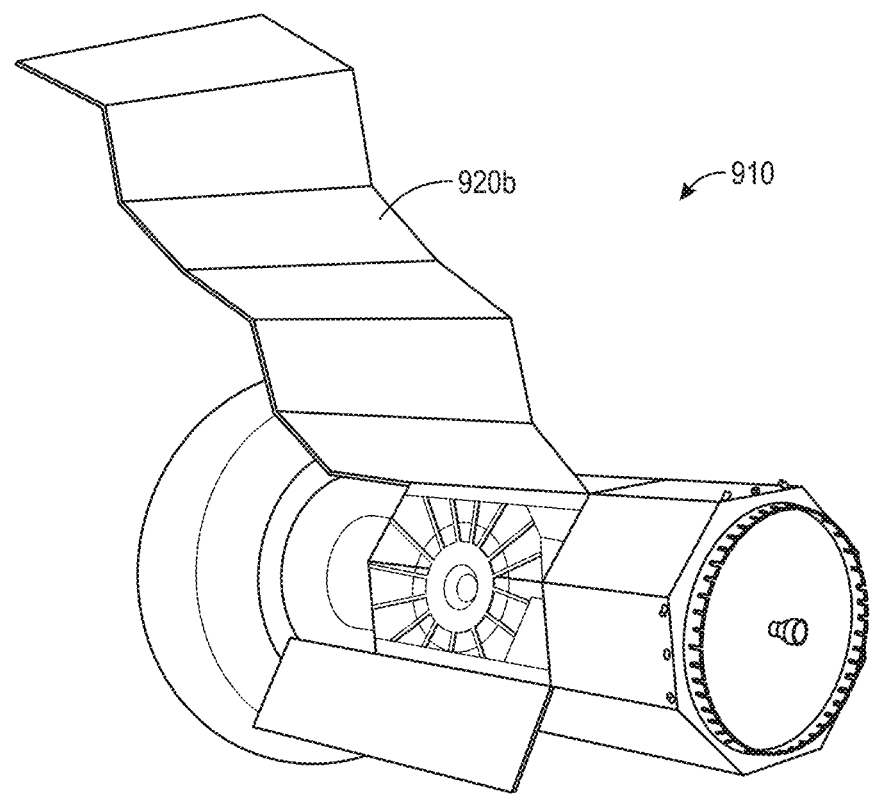
Figure 9D:
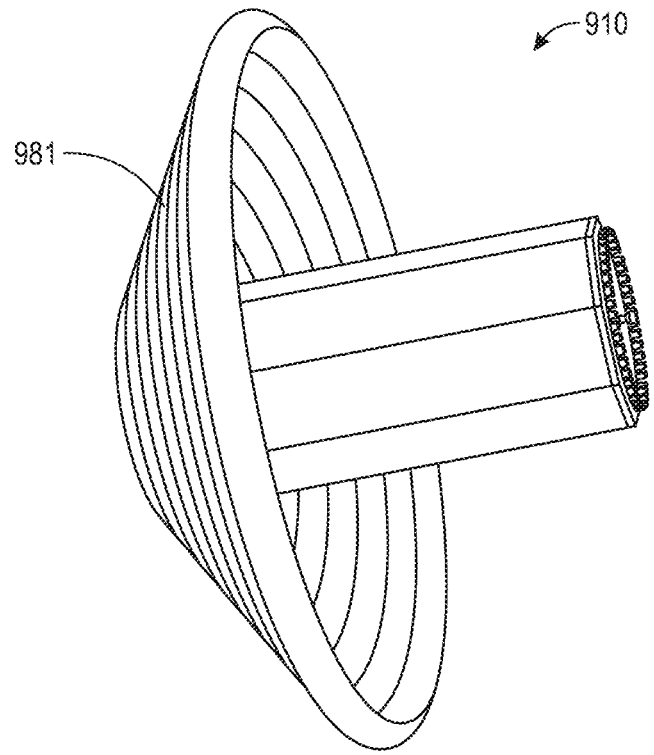

FIG. 9B illustrates the space vehicle 910 with the deployable solar panels 920b unfolded, and with the door panels 931 open to allow access to the payload bay 114. Accordingly, sensors and/or other devices positioned within the payload bay 914 can access the external environment. FIG. 9C is a further illustration of the space vehicle 910, with the deployable solar panel 920b in the process of being stowed. FIG. 9D illustrates the space vehicle 910 with the inflatable heat shield 981 deployed for re-entry.

In still further embodiments, in addition to the overall system elements described above with reference to FIG. 1B, the system can include a permanent or semi-permanent orbital platform that hosts the space vehicle 110 during its missions. The orbital platform or orbital dock can include common interface attachment features for different space vehicles to connect to. Once connected, the space vehicles can receive power, and/or other supplies for carrying out its mission. The orbital dock can provide station-keeping, power, data, communications, and/or thermal management, to the space vehicles it hosts. The orbital dock can be launched with deployable satellites carried onboard. Once dock is in orbit, the satellites can disconnect and proceed to carry out missions before returning to Earth. One advantage of this arrangement is that it can further extend the life of the space vehicles, and can reduce the number of occasions on which the space vehicles return to Earth for refurbishment. A further feature associated with this advantage is that all operations described above can be carried out autonomously, and accordingly, the orbital dock need not be have a crew onboard.

Figure 10:
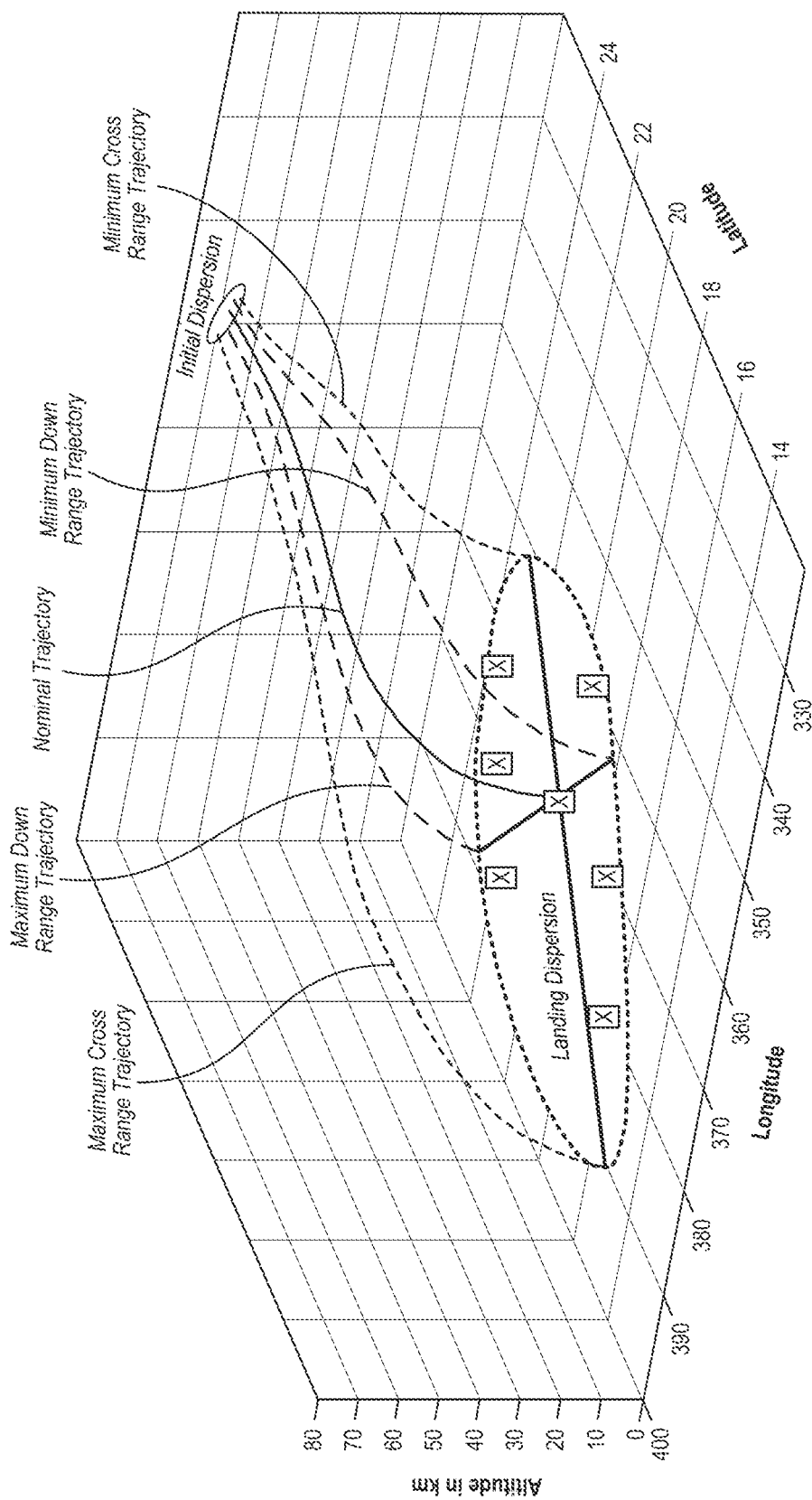
FIG. 10 illustrates a dispersion map, showing the dispersion footprint for vehicle configured to land with an inflatable paraglider wing in accordance with embodiments of the present technology.

One drawback of conventional space vehicle recovery systems is that the entry error dispersions for such space vehicles are on the order of 10 km to greater than a 1,000 km by the time the vehicle lands. A representative dispersion zone is shown in FIG. 10. Conventional methods for addressing this drawback are to carry extra on-board propellant, which is used to fire thrusters that correct for main engine burn inaccuracies. The drawback with this approach is that it reduces the payload capacity of the space vehicle, which is not efficient or economical. By contrast, embodiments of the present technology include a robotic or otherwise automated paraglider that can be deployed in the upper atmosphere (e.g., at above 10 km, above 15 km, or above 20 km altitude) where error dispersions are smaller than on the ground. Because the paraglider has a high glide ratio, and is controllable, it can more easily fly within a conventional dispersion zone (which allows for a greater flexibility of landing sites, and/or can be controlled to operate in a smaller dispersion zone (which can allow for precise landings near launch sites and/or refurbishment sites. As indicated schematically in FIG. 10 by "x's," the vehicle can be controlled to any of a large number of landing zones, including but deliberately not limited to, the one at the end of the nominal trajectory.

From the foregoing, it will be appreciated that specific embodiments of the disclosed technology have been described herein for purposes of illustration, but that various modifications may be made without deviating from the technology. For example, the space vehicle can carry out missions other than those specifically identified above, including retrieving on-orbit satellites and returning them to Earth for refurbishment and re-use. The space vehicle can have solar panels and/or other features that differ from those specifically shown herein.

Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

As used herein, the term "and/or," as in "A and/or B" refers to A alone, B alone and both A and B.

As used herein, the terms "about" and "approximately" refer to values within 10% of the stated value.

To the extent any materials incorporated herein by reference conflict with the present disclosure, the present disclosure controls.

The following examples provide additional representative features of the present technology.

1. A space system, comprising:
   a re-useable space vehicle;
   a collapsible, deployable and re-stowable re-entry heat shield carried by the space vehicle;
   a collapsible, deployable and re-stowable flexible paraglider wing carried by the space vehicle;
   a payload bay carried by the space vehicle;
   a solar panel carried by the space vehicle and positioned to operate as a door from the payload bay;
   a propulsion system carried by the space vehicle, and including multiple thrusters; and
   a pressurant tank coupled to both the heat shield and propulsion system to (a) provide a propulsive force to the space vehicle, and (b) inflate the heat shield.

2. The space system of example 1 wherein the space vehicle is elongated along a longitudinal axis, and wherein the solar panel is hinged on axis aligned with longitudinal axis.

3. The space system of any of examples 1-2 wherein the space vehicle is elongated along a longitudinal axis, and wherein the solar panel is hinged on axis transverse to the longitudinal axis.

4. The space system of any of examples 1-3, further comprising at least one visual sensor carried by the space vehicle and positioned to image at least one of the heat shield or the paraglider wing in at least one of a deployed state, a stowed state, or an intermediate state between the deployed state and the stowed state.

5. The space system of any of examples 1-4, further comprising a terrestrial refurbishment facility configured to refurbish the space vehicle after it has returned from space.

6. A space system, comprising:
   a re-useable space vehicle;
   a collapsible, deployable and re-stowable re-entry heat shield carried by the space vehicle; and
   a collapsible, deployable and re-stowable flexible paraglider wing carried by the space vehicle.

7. The space system of example 6, further comprising an inflator coupled to the heat shield to deploy the heat shield.

8. The space system of example 7 wherein the inflator includes a gas-tight pressurant tank, a gas, generator, or both.

9. The space system of any of examples 6-8 wherein the heat shield includes a plurality of inflatable, annular elements positioned to form a generally conical shape when deployed.

10. The space system of any of examples 6-9 wherein the paraglider wing includes a plurality of inflatable cells separated by ribs.

11. The space system of any of examples 6-10, further comprising:
    a deployable and re-stowable solar panel carried by the space vehicle;
    an actuator operatively coupled to the solar panel; and
    a controller operatively coupled to the actuator, the controller having instructions that, when executed:
      deploy the solar panel when the space vehicle is in space; and
      re-stow the solar panel in preparation for the space vehicle to return to earth from space.

12. The space system of any of examples 6-11, further comprising:
    a payload bay carried by the space vehicle; and
    a deployable and re-stowable solar panel carried by the space vehicle, the solar panel being movable from a first position in which it covers at least a portion of the payload bay, and a second position in which it exposes at least a portion of the payload bay.

13. The space system of any of examples 6-12, further comprising a controller having instructions that, when executed:
    deploy the heat shield;
    deploy the paraglider wing carried by the space vehicle; and
    land the space vehicle on a terrestrial surface.

14. A method for operating a space system, comprising:
    launching a space vehicle into space; and
    returning the space vehicle to earth, including by:
      deploying a collapsible heat shield carried by the space vehicle;
      deploying a collapsible paraglider wing carried by the space vehicle; and
      landing the space vehicle on a terrestrial surface.

15. The method of example 14 wherein deploying the paraglider wing includes deploying the paraglider wing at an altitude above 15 km.

16. The method of any of examples 14-15, further comprising:
    determining that the space vehicle has decelerated to a subsonic velocity; and
    based at least in part of the determining that the space vehicle has decelerated to a subsonic velocity, deploying the collapsible paraglider wing.

17. The method of any of examples 14-16, further comprising navigating the space vehicle to a landing site after the paraglider wing has deployed (a) autonomously, (b) via human interaction, or (c) both (a) and (b).

18. The method of any of examples 14-17, further comprising deforming the wing to control at least one of descent rate or a trajectory of the space vehicle.

19. The method of any of examples 14-18 wherein deploying the paraglider wing includes deploying the paraglider wing after space vehicle has decelerated to less than Mach 0.7.

20. The method of example 19, further comprising deploying a drogue chute to deploy the paraglider wing.

21. The method of any of examples 14-20, further comprising receiving an information update and automatically changing a trajectory of the space vehicle from a pre-planned descent route based at least in part on the information update.

22. The method of any of examples 14-21, further comprising collapsing the heat shield before deploying the paraglider wing.

23. The method of any of examples 14-22, further comprising deploying the paraglider wing while the heat shield is also deployed.

24. The method of any of examples 14-23, further comprising:
refurbishing the space vehicle after landing; and
re-launching the space vehicle following refurbishment.

25. The method of example 24 wherein refurbishing includes accessing compartments of the space vehicle, refurbishing components within the compartments, and re-securing the compartments in the compartments.

26. The method of example 24, further comprising manufacturing the space vehicle and refurbishing the space vehicle at the same facility.

We claim:

1. A space system, comprising:
a re-useable space vehicle configured to operate in space and to re-enter Earth's atmosphere;
a collapsible, deployable and re-stowable re-entry heat shield carried by the space vehicle, wherein the heat shield deploys to a position that protects the vehicle from heat load;
a collapsible, deployable and re-stowable flexible paraglider wing carried by the space vehicle, wherein the wing deploys to a position spaced apart from the heat shield and provides lift to the space vehicle within the atmosphere for landing;
a payload bay carried by the space vehicle;
a solar panel carried by the space vehicle and positioned to operate without obstructing the payload bay during space flight;
a propulsion system carried by the space vehicle, and including multiple thrusters;
one or more pressurant tanks coupled to either or both of the heat shield and propulsion system to (a) provide a propulsive force to the space vehicle, or (b) inflate the heat shield; and
a vehicle controller coupled to the heat shield, wing and propulsion system to enable coordinated guidance, navigation and control of the space vehicle in space, through re-entry into the atmosphere, and within the atmosphere.

2. The space system of claim 1 wherein the space vehicle is elongated along a longitudinal axis, and wherein the solar panel is hinged on axis aligned with longitudinal axis.

3. The space system of claim 1 wherein the space vehicle is elongated along a longitudinal axis, and wherein the solar panel is hinged on axis transverse to the longitudinal axis.

4. The space system of claim 1, further comprising at least one sensor carried by the space vehicle and positioned to sense at least one of the heat shield or the paraglider wing in at least one of a deployed state, a stowed state, or an intermediate state between the deployed state and the stowed state.

5. The space system of claim 1, further comprising a terrestrial refurbishment facility configured to refurbish the space vehicle after it has returned from space.

6. A space system, comprising:
a re-useable space vehicle configured to operate in space and within Earth's atmosphere;
a collapsible, deployable and re-stowable re-entry heat shield carried by the space vehicle and configured to be deployed to resist heat loads upon re-entry into the atmosphere;
a collapsible, deployable and re-stowable flexible paraglider wing carried by the space vehicle and configured to be deployed to provide lift and control to the vehicle;
one or more sensors carried by the space vehicle to determine state of the heat shield and paraglider wing and to provide vehicle speed, acceleration, location and gyroscopic data; and
a vehicle controller coupled to the sensors, the heat shield and the paraglider wing to selectively deploy the heat shield and deploy and manipulate the paraglider wing to facilitate coordinated re-entry of the space vehicle from space into and within the atmosphere.

7. The space system of claim 6, further comprising an inflator coupled to the heat shield to deploy the heat shield.

8. The space system of claim 7 wherein the inflator includes a gas-tight pressurant tank, a gas, generator, or both.

9. The space system of claim 6 wherein the heat shield includes a plurality of inflatable, annular elements positioned to form a generally conical shape when deployed.

10. The space system of claim 6 wherein the paraglider wing includes a plurality of inflatable cells separated by ribs, and wherein wing has a glide ratio of that exceeds 5:1.

11. The space system of claim 6, further comprising:
a deployable and re-stowable solar panel carried by the space vehicle; an actuator operatively coupled to the solar panel; and
a controller operatively coupled to the actuator, the controller having instructions that, when executed:
deploy the solar panel when the space vehicle is in space; and
re-stow the solar panel in preparation for the space vehicle to return to earth from space.

12. The space system of claim 6, further comprising:
a payload bay carried by the space vehicle; and
a deployable and re-stowable solar panel carried by the space vehicle, the solar panel being movable from a first position in which it covers at least a portion of the payload bay, and a second position in which it exposes at least a portion of the payload bay.

13. The space system of claim 6, wherein the controller includes instructions that, when executed:
deploy the heat shield;
deploy the paraglider wing carried by the space vehicle; and land the space vehicle on a terrestrial surface.

14. A method for operating a space system, comprising:
launching a space vehicle configured as a satellite into space;
independently operating the space vehicle for at least a portion of mission;
returning the space vehicle to earth, including by:
deploying a collapsible heat shield carried by the space vehicle to protect against heat load;

deploying a collapsible paraglider wing carried by the space vehicle to enable deceleration and control of the vehicle;

providing one or more sensors carried by the space vehicle to provide sensor data indicating the state of the vehicle, including the deployment of the heat shield and paraglider wing; and selectively coordinating operation of the heat shield and paraglider wing using the sensor data for re-entering the space vehicle into the atmosphere and guiding, navigating, controlling and landing the space vehicle on a targeted location of terrestrial surface.

15. The method of claim 14 wherein deploying the paraglider wing includes deploying the paraglider wing at an altitude above 15 km.

16. The method of claim 14, further comprising:
determining that the space vehicle has decelerated to a subsonic velocity; and
based at least in part of the determining that the space vehicle has decelerated to a subsonic velocity, deploying the collapsible paraglider wing.

17. The method of claim 14, further comprising navigating the space vehicle to a landing site after the paraglider wing has deployed (a) autonomously, (b) via human interaction, or (c) both (a) and (b).

18. The method of claim 14, further comprising deforming the wing to control at least one of descent rate or a trajectory of the space vehicle.

19. The method of claim 14 wherein deploying the paraglider wing includes deploying the paraglider wing after space vehicle has decelerated to less than Mach 0.7.

20. The method of claim 17, further comprising deploying a drogue chute to deploy the paraglider wing.

21. The method of claim 14, further comprising receiving an information update and automatically changing a trajectory of the space vehicle from a pre-planned descent route based at least in part on the information update.

22. The method of claim 14, further comprising collapsing the heat shield before deploying the paraglider wing.

23. The method of claim 14, further comprising deploying the paraglider wing while the heat shield is also deployed.

24. The method of claim 14, further comprising:
refurbishing the space vehicle after landing; and
re-launching the space vehicle following refurbishment.

25. The method of claim 24 wherein refurbishing includes accessing compartments of the space vehicle, refurbishing components within the compartments, and re-securing the compartments in the compartments.

26. The method of claim 24, further comprising manufacturing the space vehicle and refurbishing the space vehicle at the same facility.

27. The method of claim 14 wherein the step of deploying the collapsible paraglider wing carried by the space vehicle to enable deceleration and control of the vehicle comprises deploying a paraglider wing having at least a 5:1 glide ratio.

28. A space system comprising:
a re-furbishable space vehicle in the form of a satellite configured to operate in space and to re-enter Earth's atmosphere;
a deployable and collapsible re-entry heat shield coupled to the space vehicle though an actuator, wherein the heat shield is configured when deployed to protect the space vehicle from heat loads;
a deployable and collapsible flexible wing coupled to the space vehicle through a plurality of cords, wherein the wing has a surface and wherein the vehicle is steerable through deformation of the surface of the wing when deployed by applying tension to the cords;
a payload carried by the space vehicle;
one or more thrusters carried by the space vehicle;
one or more sensors carried the space vehicle and configured to assess state of the vehicle, including state of the heat shield and state of the wing during re-entry and within the atmosphere; and
a vehicle controller coupled to the heat shield, wing, propulsion system and sensors to enable coordinated guidance, navigation and control of the space vehicle as it descends into and within the atmosphere for targeted landing on terrestrial surface.

29. The space system of claim 28, further comprising an inflator coupled to the heat shield to deploy the heat shield.

30. The space system of claim 28, wherein the heat shield includes a plurality of inflatable, annular elements positioned to form a generally conical shape when deployed.

31. The space system of claim 28, wherein the heat shield includes a plurality of thermal resistant material elements that are mechanically deployed to form a generally conical shape when deployed.

32. The space system of claim 28 wherein the wing is a paraglider having a glide ratio above 5:1.

33. The space system of claim 28 wherein the wing is a paraglider having a glide ratio above 12:1.

34. The space system of claim 28, further comprising:
a deployable and re-stowable solar panel carried by the space vehicle;
an actuator operatively coupled to the solar panel; and
wherein the vehicle controller is operatively coupled to the actuator, and wherein the controller having instructions that, when executed:
deploy the solar panel when the space vehicle is in space; and
re-stow the solar panel in preparation for the space vehicle to return to earth from space.

35. The space system of claim 28, further comprising a deployable and re-stowable solar panel carried by the space vehicle, the solar panel being movable from a first position in which it covers at least a portion of the payload, and a second position in which it exposes at least a portion of the payload.

36. The space system of claim 28, wherein the wing includes a plurality of inflatable cells separated by ribs.

37. The space system of claim 28, where the wing comprises a flexible material.

* * * * *